United States Patent [19]

Noble

[11] 4,412,655

[45] * Nov. 1, 1983

[54] LAND IRRIGATION SYSTEM AND METHOD

[75] Inventor: Allen T. Noble, Boise, Id.

[73] Assignee: Noble Linear Irrigation, Inc., Boise, Id.

[*] Notice: The portion of the term of this patent subsequent to Jun. 23, 1998, has been disclaimed.

[21] Appl. No.: 419,321

[22] Filed: Sep. 17, 1982

Related U.S. Application Data

[63] Continuation of Ser. No. 146,122, May 2, 1980, abandoned, which is a continuation-in-part of Ser. No. 80,060, Sep. 28, 1979, Pat. No. 4,274,584, and Ser. No. 887,792, Mar. 17, 1978, abandoned.

[51] Int. Cl.$^3$ ............................................. A01G 25/09
[52] U.S. Cl. ................................. 239/183; 239/711; 239/721; 251/149.6; 285/5; 285/18
[58] Field of Search .................. 285/5, 18; 137/899.1; 251/149.6; 239/178, 183, 184, 709, 711, 721

[56] References Cited

U.S. PATENT DOCUMENTS

| | | |
|---|---|---|
| Re. 26,285 | 10/1967 | Stafford . |
| 2,750,228 | 6/1956 | Engel . |
| 3,281,080 | 10/1966 | Hogg . |
| 3,381,893 | 5/1968 | Smith, Jr. et al. ............... 239/1 |
| 3,444,941 | 5/1969 | Purtell ................... 239/183 X |
| 3,446,434 | 5/1969 | Smith, Jr. et al. . |
| 3,463,175 | 8/1969 | Rogers . |
| 3,575,200 | 4/1971 | Imeson ..................... 239/183 |
| 3,729,016 | 4/1973 | Von Linsowe . |
| 3,970,102 | 7/1976 | Harvey ..................... 137/899.1 |
| 4,036,436 | 7/1977 | Standal ..................... 239/183 |
| 4,142,740 | 3/1979 | Wilms ..................... 285/18 |
| 4,159,080 | 6/1979 | Standal ..................... 239/183 |
| 4,172,556 | 10/1979 | Standal ................... 239/183 X |
| 4,192,335 | 3/1980 | Standal ................... 239/183 X |
| 4,216,794 | 8/1980 | Standal ................... 239/711 X |
| 4,274,584 | 6/1981 | Noble ..................... 239/183 X |

FOREIGN PATENT DOCUMENTS

| | | |
|---|---|---|
| 2402916 | 7/1974 | Fed. Rep. of Germany ...... 239/183 |
| 456906 | 11/1936 | United Kingdom . |
| 120390 | 4/1958 | U.S.S.R. . |
| 363463 | 3/1973 | U.S.S.R. . |
| 434918 | 11/1974 | U.S.S.R. . |

OTHER PUBLICATIONS

"Valley ® Ranger", Model 9170 Continuous Linear Move System, 40 to 220 Acre Irrigation, Valmont Industries Inc., Valley Neb., Pub. 1977.

Primary Examiner—Andres Kashnikow
Attorney, Agent, or Firm—Shanley, O'Neil and Baker

[57] ABSTRACT

A land irrigation system is illustrated in which an elongated sprinkler line continuously travels in a direction transverse to its length along the length dimension of a stationary water main and is continuously supplied with water from upstanding hydrants spaced along the length of the water main. A driven tractor moves along the water main at substantially the same rate as the sprinkler line and a plurality of elongated water carrying pipe connector devices each have one end portion connected to the sprinkler line and their other end portions movable into position for automatic connection to and disconnection from successive hydrants along the main, to permit substantially continuous movement of the tractor along the water main and movement of the respective water carrying connecting size devices into position for connection to the hydrants. Improved hydrant coupling and water valve activating mechanism carried on the water pipe connector devices cooperate with improved hydrant and water valve structure to facilitate connection with and disconnection from the hydrants to maintain continuous water pressure to the sprinkler line.

70 Claims, 16 Drawing Figures

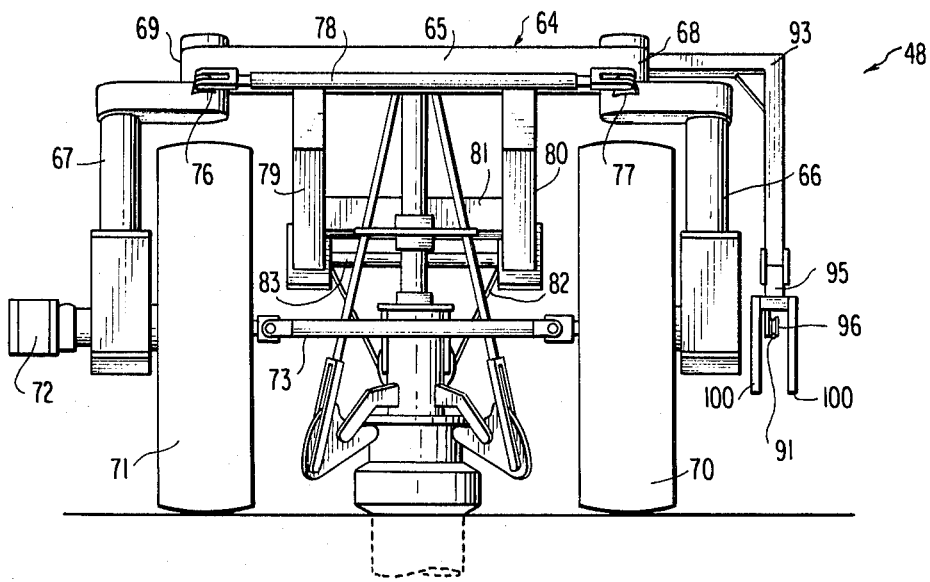
FIG.5
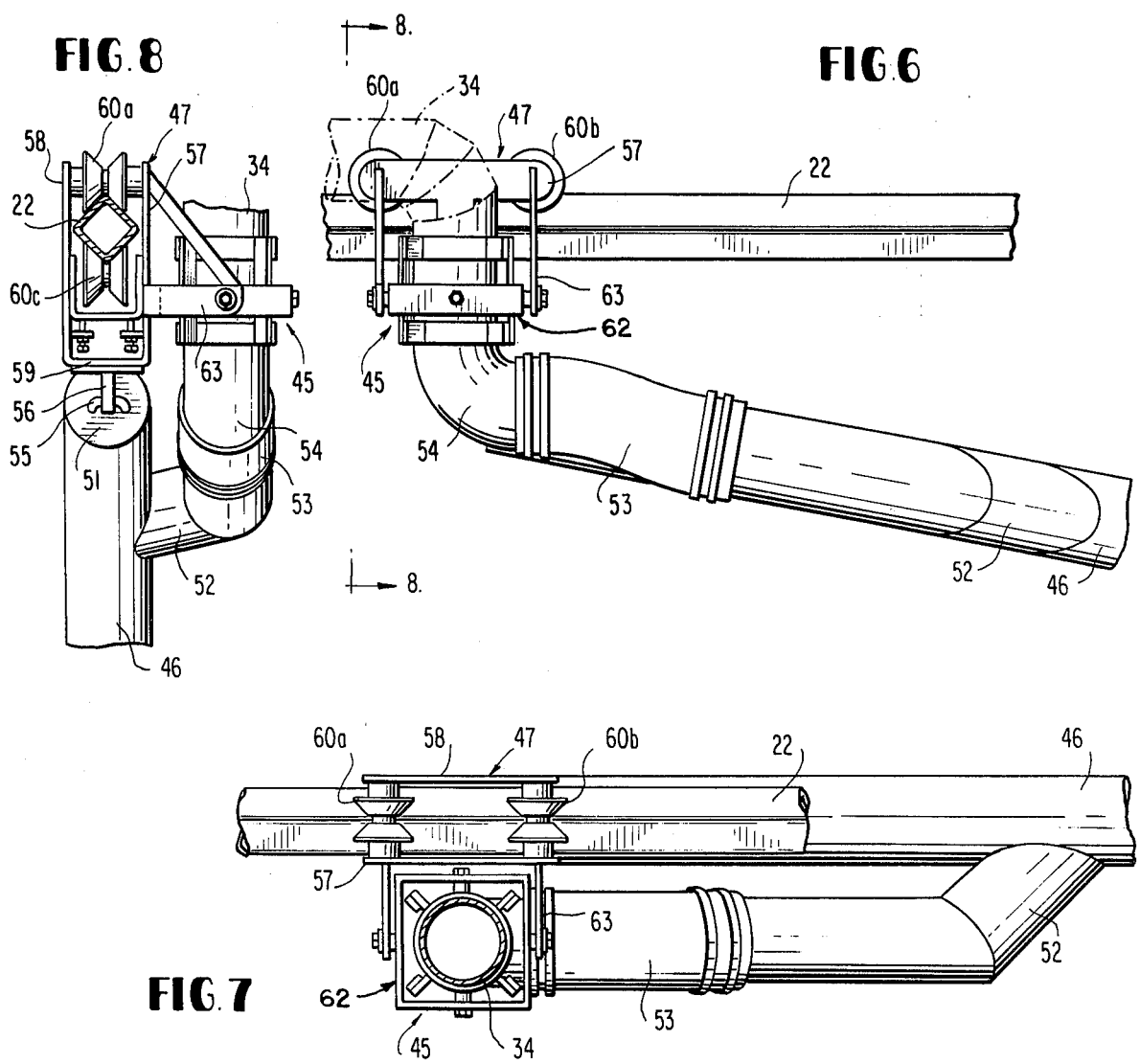
FIG.8
FIG.6
FIG.7

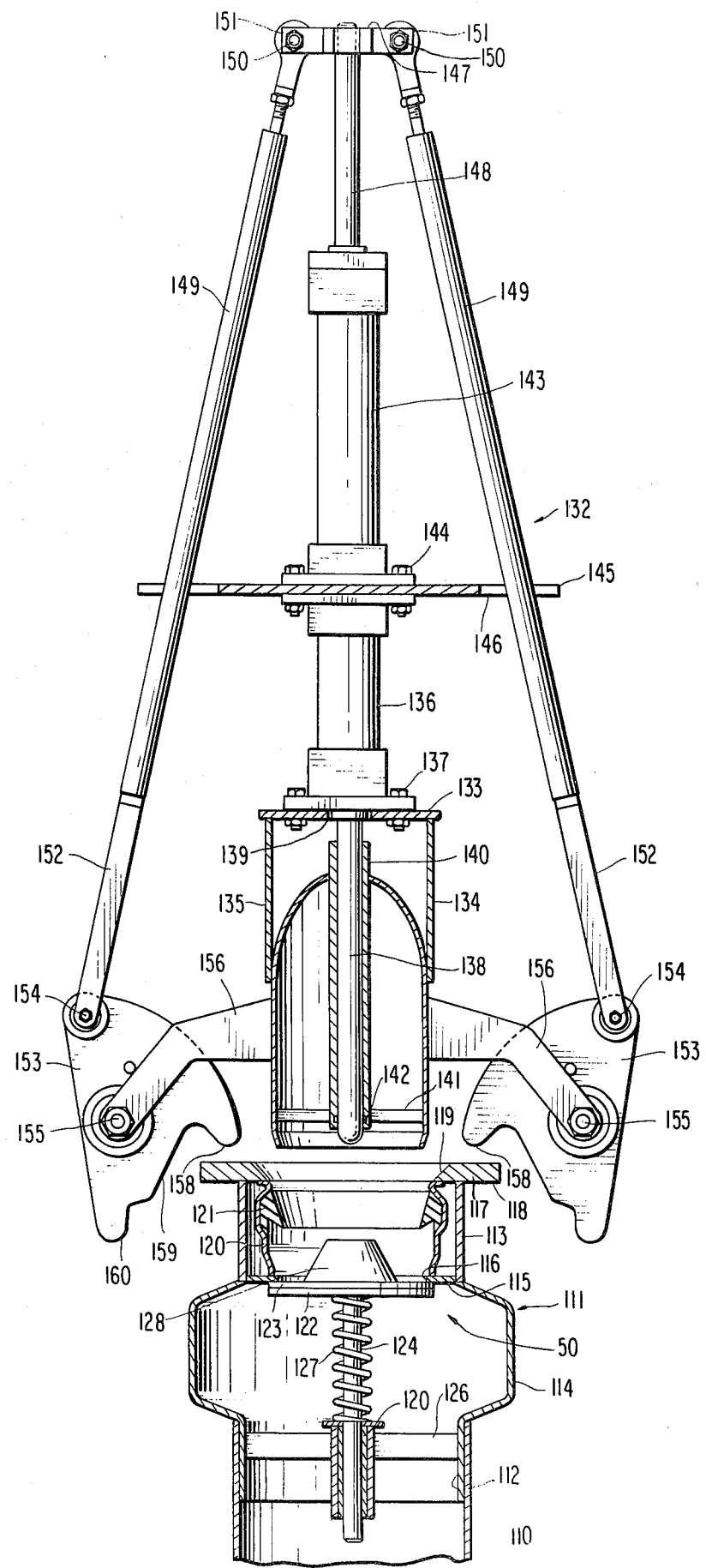

FIG 10
FIG 11
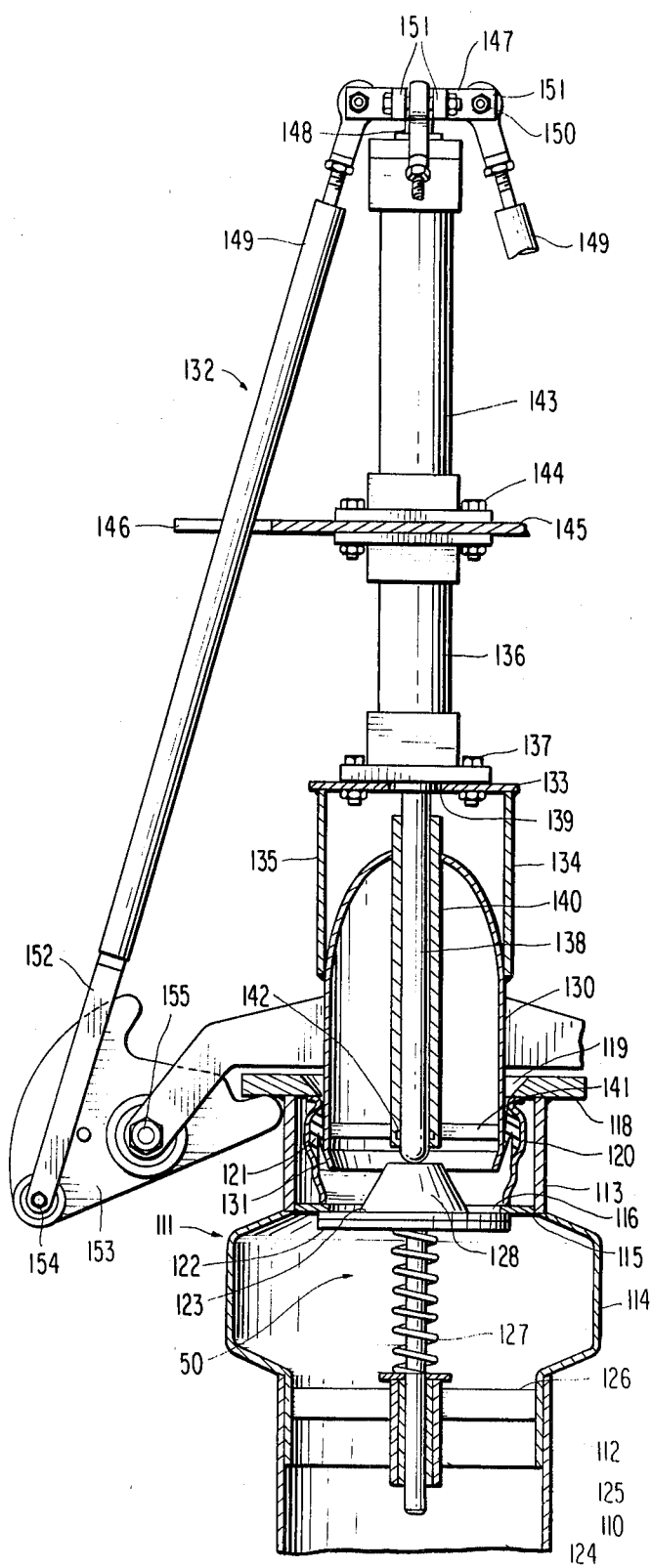
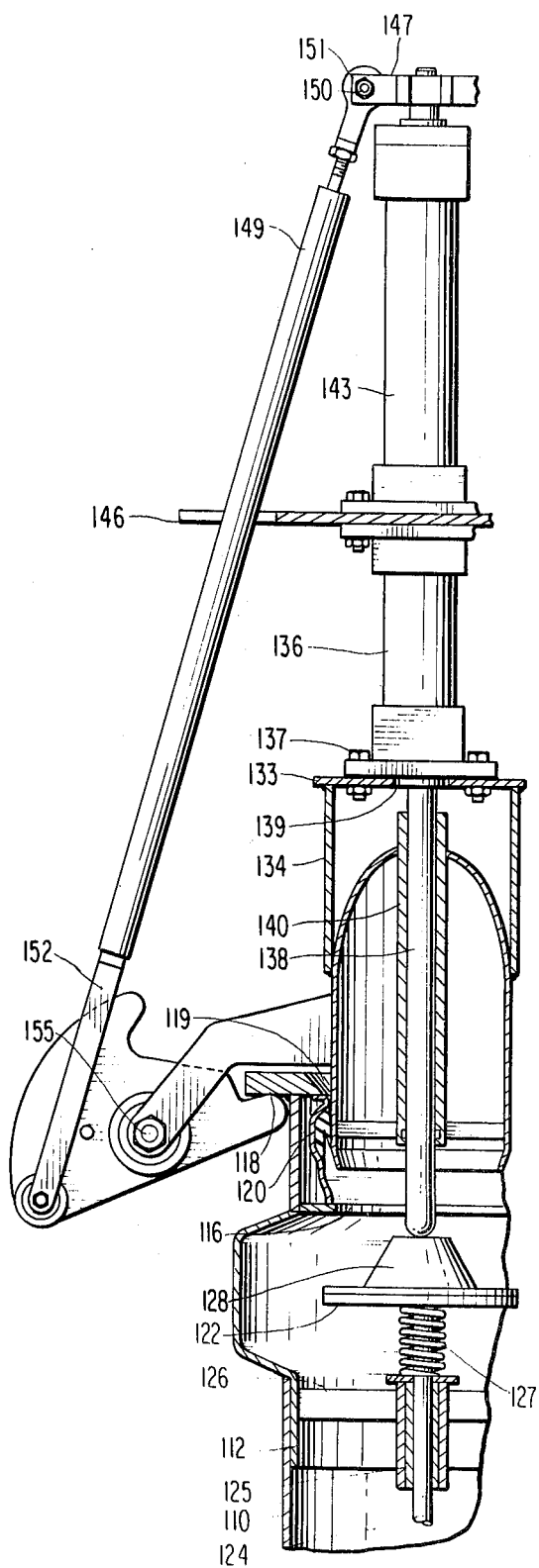

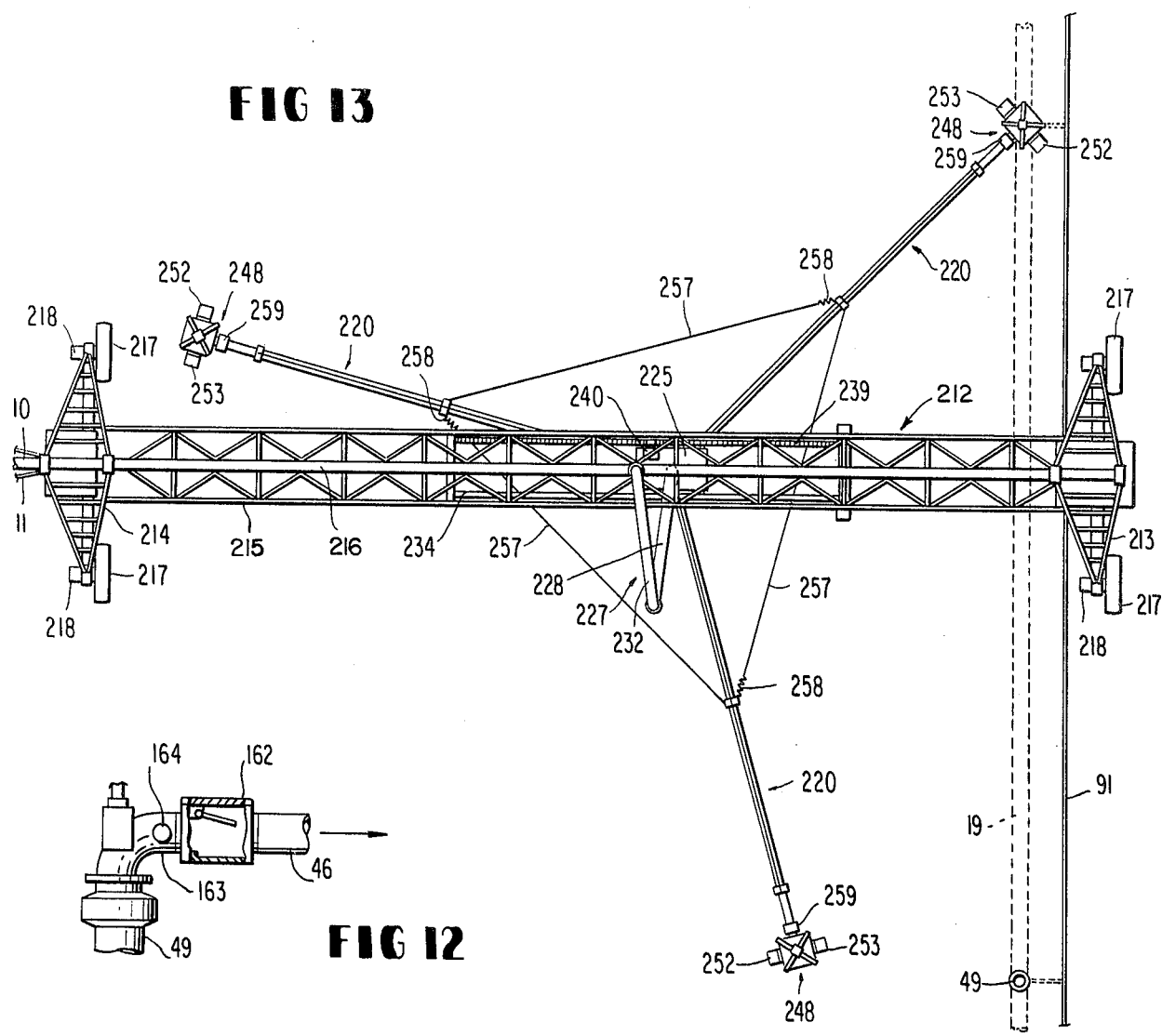
FIG 13
FIG 12
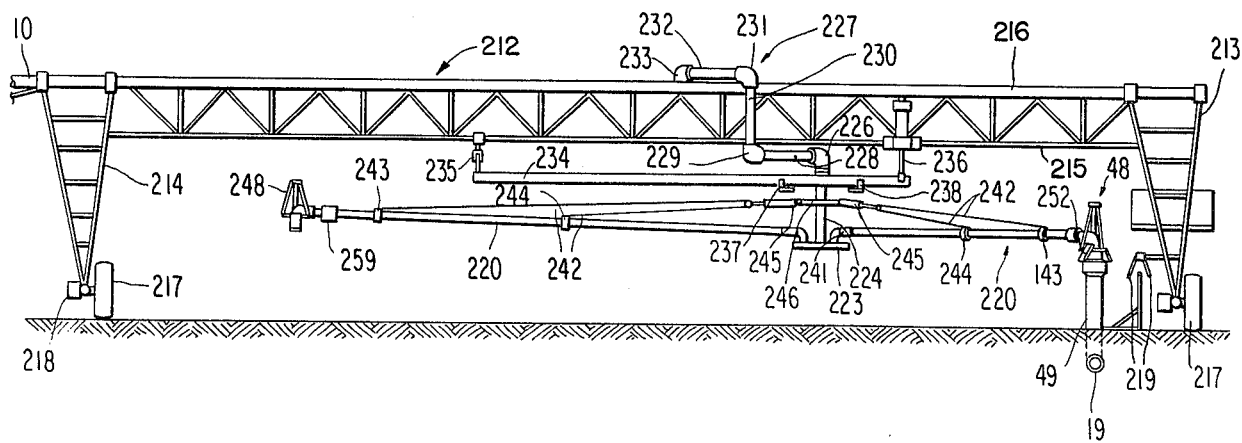
FIG 14

LAND IRRIGATION SYSTEM AND METHOD

RELATED APPLICATIONS

This is a continuation of application Ser. No. 146,122, filed May 2, 1980, now abandoned, the entire disclosure of which is incorporated herein by reference, which in turn is a continuation in part of my copending applications Ser. No. 80,060 filed Sept. 28, 1979, now U.S. Pat. No. 4,274,584 and Ser. No. 887,792 filed Mar. 17, 1978 now abandoned.

BACKGROUND OF THE INVENTION

1. Field of the Invention

This invention is for use in connection with a land irrigation system in which a moving water sprinkler line having a water inlet at one point extends laterally to and moves along the length dimension of a stationary water supply main having a plurality of water outlet valves at equally spaced points along its length, and particularly involves an apparatus including automatic coupling means for successively connecting the water outlet valves with water inlet means of the sprinkler line, the apparatus including a driven conveyance means for moving along the length dimension of the stationary water supply main at substantially the same overall rate of movement as the moving sprinkler line.

This invention is also useful in connection with a method of land irrigation wherein a moving sprinkler line having a water inlet at one point moves along the length of a stationary water supply main having water outlet valves in hydrants located at spaced intervals along the length thereof, the method involving the use of automatic coupling means for successively connecting the water outlet valves with water inlet means of the sprinkler line to obtain a substantially continuous water supply to the sprinkler line.

2. Description of the Prior Art

When irrigating extensive areas of land, long sprinkler lines have been used for some time. Water has been supplied to these lines from buried pipes or mains having spaced risers projecting above the surface of the ground for connection to the sprinkler lines. Initially each time a sprinkler line had to be moved, manual labor was required for this purpose. This was a laborious and time consuming operation. At time went on, the sprinkler lines, which can reach a length of a quarter of a mile and more were fitted with wheels to make them easier to move. Eventually, power was supplied in one way or another to the wheeled lines to keep them moving slowly along the desired path parallel to the direction of the main line, with flexible hoses extending between the water inlet end of the sprinkler lines and the riser to which the sprinkler line was connected. Since the mains can be eight or more inches in diameter and contain water under substantial pressure, the required size and strength of the flexible hoses became extremely burdensome in manual operation. Proposals were therefore made to facilitate connection of the sprinkling lines to successive risers with the least manual effort but it is not believed that a successful machine has previously been developed. Examples of such proposals are illustrated in Engel U.S. Pat. No. 2,750,228, Stafford U.S. Pat. No. Re. 26,285 and Smith et al U.S. Pat. Nos. 3,381,893 and 3,446,434. Such proposals provided for intermittent connection of the sprinkler line to the main line utilizing power assisted mechanical devices as the hoses or telescoping pipes were moved from riser to riser, with the sprinkler line continuing to move along at the desired rate.

In order to provide for a continual source of water to the sprinkler line Rogers U.S. Pat. No. 3,463,175, Standal U.S. Pat. No. 4,036,436, and Russian Pat. No. 434,918 proposed systems in which one riser is always connected to the sprinkler line, this being accomplished by having pipe or hose connections to the sprinkler line connect with devices which span three risers. By the arrangement employed in the Rogers and Standal patents, the forward part of the device is disconnected from a first riser and goes on to a second riser ahead of the first riser and, upon connection of the device with the second riser, the hindmost part of the device is disconnected from a third riser which is behind the first riser in the main lines moves up to and is connected with the first riser. The requirement for closely spaced risers and the unavailability of reliable water valve connecting and operating means may have contributed to the failure of these systems to have gained wide-spread commercial acceptance.

In the Russian patent, an elongated horizontal pipe having water valve connecting means at each end is pivotally mounted at its center by a downturned ell on the forward end of a second, forwardly projecting elongated horizontal pipe which, in turn, is pivotally mounted at its rear end by an upturned ell to a sprinkler line carried by a mobile carriage. The carriage moves along a water main so that when the valve connecting means on one end of the first pipe is connected to a hydrant valve, the doubly pivoted mounting permits the other end of the first pipe to swing in an arc around the hydrant to bring the other valve connecting means into position to be connected to a second hydrant valve (apparently manually) before the first is disconnected. The entire water connecting means is, therefore, cantilevered forward of the carriage. Although the illustrated structure could be modified so as to be theoretically operable, the inoperability of the structure illustrated suggests that this device also may have never been actually used.

Von Linsowe U.S. Pat. No. 3,729,016 discloses another irrigation system for continuously feeding water to a sprinkler line, but this system is extremely complicated and requires twin main lines since the twin coupling devices for connecting the sprinkler line to the main line cannot pass each other. This proposal appears to have the same history in practice as the systems of the Rogers and Standal patents mentioned above.

SUMMARY OF THE INVENTION

The primary object of the present invention is to provide an economical and durable land irrigation system of the type employing an elongated sprinkler line movable transversely of its length along the length dimension of a water main and including improved means for connecting the sprinkler line to successive hydrants spaced along the water main to continuously maintain water pressure to the sprinkler line as it is moved through a field.

Another object is to provide such an irrigation system in which a movable conveyance means, hereinafter generally referred to as a tractor, is driven along the water main at substantially the same rate as the sprinkler line and includes a pair of hydrant connectors each connected to the sprinkler line and each including improved means for automatically connecting the sprinkler line to and disconnecting it from each hydrant in succession along the water main with one of the connectors being connected to a hydrant at all times.

In the attainment of the foregoing and other objects and advantages, an important feature of the invention resides in providing a simple, reliable connector apparatus for maintaining a continuous water flow path from the water main to the moving sprinkler line and for moving the connector apparatus along the water main and successively connecting and disconnecting each of a plurality of connector pipes to hydrants substantially equally spaced along the water main, with the apparatus requiring a minimum of energy and maintenance. This is accomplished in a preferred embodiment of the invention in which a tractor is driven along the water main at the same rate as the sprinkler line and is guided along a controlled path relative to the main. Elongated track means is mounted on the tractor and extends in generally parallel upwardly spaced relation to the water main and a pair of elongated connector pipes or conduit means each having one end portion supported on the track means for movement therealong. Conduit means including an articulated pipe assembly connects the inner, track supported ends of the connector pipes to the sprinkler line.

The connector pipes extend outwardly in opposite direction from the tractor and generally parallel to the water main and to the track means, and each has its outer end supported by a carriage or truck having driven around engaging wheels for moving the connector pipes along the track means relative to one another and relative to the tractor. Each connector pipe includes an improved hydrant locating and connecting means and valve operating means on its outer end for engaging and automatically connecting the pipe to the hydrants and activating the valves. The respective carriages are guided along a controlled path relative to the water main by suitable means such as a wire or cable extending in fixed relation to the water main to initially position the outer end portion of the pipes relative to the hydrants, and power means carried on the carriages is operable to accurately locate the end section of the connector pipes relative to the hydrants and to automatically connect to and disconnect from the hydrants. Valve activating means opens the hydrant valves only after connection has been accomplished, and closes the valve before disconnecting from the hydrants.

In the preferred embodiment of the apparatus briefly described above, the tractor is driven through the field at a substantially constant rate corresponding to the rate of movement of the sprinkler line. One of the connector pipes, for example the rearwardly projecting pipe, has its outer end connected to a hydrant and will remain stationary for a period of time as the tractor continues to move forward. During this time, the forwardly extending connector pipe can be disconnected from its hydrant and driven forward at a rate greater than the rate of the tractor with its inner end rolling outwardly along the track until the outer end reaches and is connected to the next hydrant and the water valve in the hydrant is opened. This occurs prior to the rearwardly extending end of the track reaching the inner end of the first connector pipe. When the forwardly extending connector pipe is connected to a hydrant, the rearwardly extending pipe is disconnected and driven forward, again at a rate greater than the rate of the tractor, so that its outer end is in position to be connected to the next hydrant, in succession, prior to disconnecting the forwardly extending connector pipe from its hydrant. Thus, water pressure is maintained continuously through one of the connector pipes to the sprinkling line to provide an uninterrupted flow of water and to enable continuous movement of the sprinkler line for a more uniform application of water to the field.

In a second embodiment of the invention, the connector pipes have their outlets connected to a rotatable water manifold mounted for limited lateral movement on the tractor, with the manifold connected to the sprinkler line through a suitable swivel joint or flexible conduit. The connector pipes have the improved hydrant valve coupling means on their other end for connection with and disconnection from the successive hydrant as the tractor moves through the field. The connector pipes extend generally radially outward from the rotatable manifold so that, with one pipe connected with a hydrant, the manifold rotates to bring the coupling means on another connector pipe into position to be connected to the next hydrant as the tractor moves progressively along the water main. Movement of the tractor thus causes or assists in rotation of the manifold as well as limited lateral movement along suitable guide track support means to automatically bring the radially extending arms into coupling relationship with the hydrants. As in the previously mentioned embodiment, one connector pipe is always connected to a hydrant to maintain water pressure to the sprinkler line.

BRIEF DESCRIPTION OF THE DRAWINGS

The foregoing and other features and advantages of the invention will become apparent from the detailed description contained hereinbelow, taken in conjunction with the drawings, in which:

FIG. 5 is an end elevation view of the structure shown in FIG. 3;

FIG. 6 is an enlarged fragmentary side elevation view taken along line 6—6 of FIG. 1;

FIG. 7 is a top plan view of the structure of FIG. 6;

FIG. 8 is a sectional view taken on line 8—8 of FIG. 6;

FIG. 9 is an enlarged fragmentary sectional view, taken along line 9—9 of FIG. 3 and showing the coupling means in position to be coupled to a hydrant;

FIG. 10 is a view similar to FIG. 9, showing the coupling means connected to the hydrant;

FIG. 11 is a view similar to FIG. 9 and showing the hydrant water valve actuated;

FIG. 12 is a fragmentary elevation view of the coupling means connected to a hydrant, with portions broken away to more clearly illustrate other parts;

FIG. 13 is a top plan view, similar to FIG. 1, of an alternate embodiment of the invention;

FIG. 14 is a side elevation view of the apparatus shown in FIG. 13;

DESCRIPTION OF THE PREFERRED EMBODIMENTS

Figure 1:
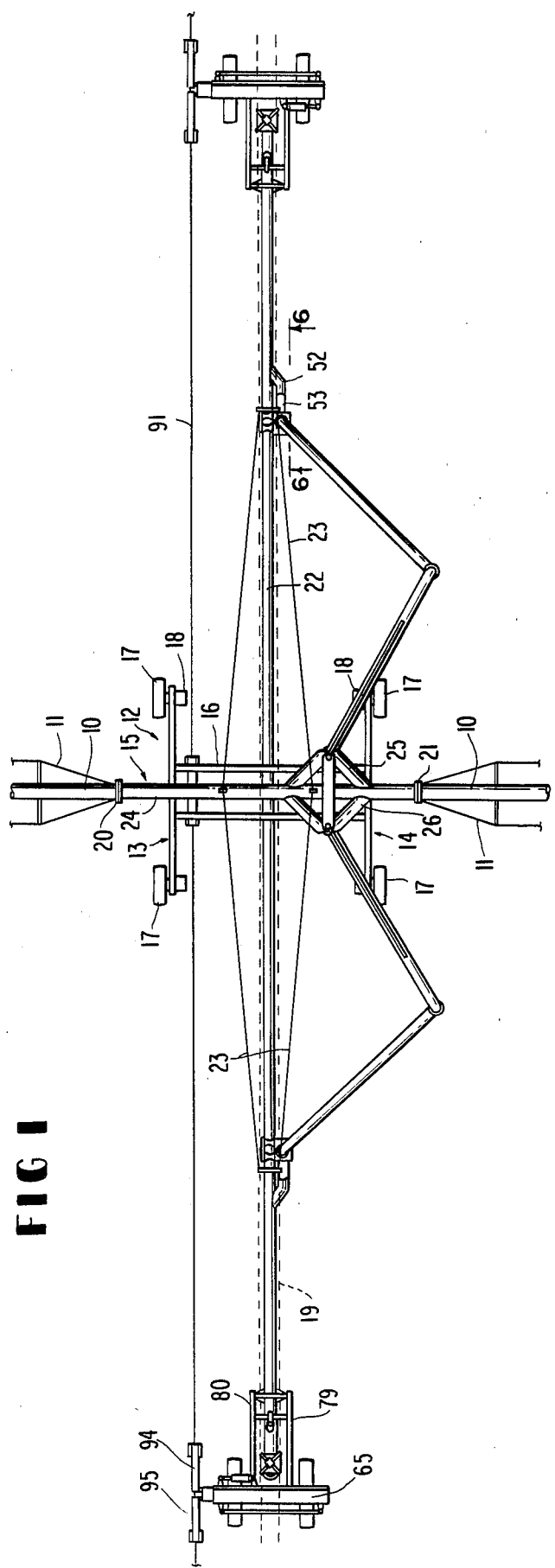
FIG. 1 is a top plan view of an irrigation apparatus embodying the present invention connected between a sprinkler line and a subterranean water main with the water main being shown in broken line.
Figure 2:
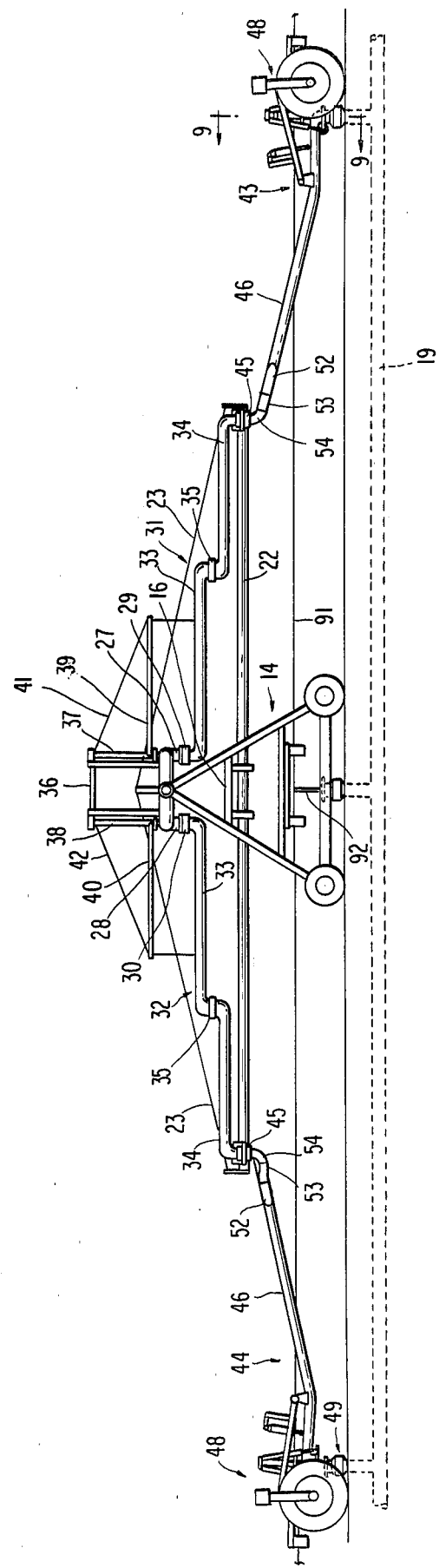
FIG. 2 is a side elevation view of the apparatus shown in FIG. 1.

Referring first to FIGS. 1 and 2 of the drawings, a pair of water sprinkler lines, designated generally by the reference numeral 10, are shown supported by a truss structure 11 and each having one end mounted at the top of a driven, wheeled conveyance mechanism, or tractor, designated generally by the reference numeral 12. The tractor 12 has an open frame structure including a pair of laterally spaced A-frame assemblies 13, 14 rigidly joined at their top by an elongated water pipe or manifold assembly 15 and at a point spaced below the manifold 15 by a structural platform 16. Wheels 17 located one at each corner of the assembly support the tractor for movement over the ground. Each wheel 17 is preferably driven by a separate motor means 18, and means are provided to synchronize the respective drive motors to control movement of the tractor along the length dimension of a fixed subterranean water main indicated by the broken lines at 19. Suitable flexible couplings 20, 21 are provided between the sprinkler lines 10 and the manifold 15 to permit limited pivotal or steering movement between the tractor 12 and the sprinkling lines 10. Although two separate sprinkling lines 10 are illustrated, it is understood that only one sprinkling line extending outwardly from one side of the tractor may be used.

An elongated support rail, or track 22 has its central portion rigidly mounted on horizontal platform 16 at a point substantially midway between the A-frames 13, 14. Track 22 is generally horizontal and extends fore and aft of the tractor in a line substantially parallel to the water main 10. The track may be made of any suitable material such as a length of heavy wall pipe, a rolled structural shape, or the like, and suitable cable or other bracing 23 extending between the ends of the track and the manifold 15 is provided to carry a portion of the weight of and stabilize the track against undue flexing or bending. In the preferred embodiment illustrated, track 22 has a rectangular or square cross section and is mounted with two diagonally opposed corners in a vertical plane for reasons pointed out below.

The manifold assembly 15 includes an elongated rigid pipe 24 extending between and rigidly connected to the top of A-frames 13 and 14, with the ends of pipe 24 extending outwardly therefrom for connection to the sprinkler lines 10 by the couplings 20, 21. At a location adjacent one of the A-frames, for example A-frame 14 as shown in FIG. 1, a pair of ells or generally V-shaped pipe members 25, 26 have their open ends welded in openings in the sides of pipe 24, with members 25 and 26 forming rigid pipe loops extending horizontally outward from both sides of the pipe 24. A pair of short pipe sections 27, 28 welded into and project downwardly from the outer portion of V-shaped pipe members 25, 26, respectively, support a pair of swivel couplings 29, 30 respectively on their bottom open ends to pivotally support one end of a pair of identical articulated pipe assemblies 31, 32. Since articulated pipe assemblies 31, 32 are identical, like reference numerals will be employed herein and in the drawings to designate corresponding parts of both assemblies.

Articulated pipe assemblies 31, 32 each includes a pair of elongated pipes 33, 34 each terminating at one end in an upwardly directed ell and at the other end in a downwardly directed ell. Pipes 33 have their upwardly directed ends pivotally supported by the swivel couplings 29, 30 and their downwardly directed ends pivotally connected by swivel couplings 35, to the upwardly directed ends of the pipes 34. A rigid, open bracket 36 welded on and projecting above the V-shaped pipe members 25, 26 supports a pair of posts 37, 38 for limited pivotal movement about the vertical axis of the swivel couplings 29, 30, respectively.

Elongated, rigid arms 39, 40, respectively, are welded onto and project laterally from the lower ends of posts 37, 38, respectively, and guy wires 41, 42, respectively, connect the top portion of the posts and the outwardly projecting ends of the arms 39, 40. Wires 41, 42 extend downward from the ends of the arms 39, 40 and are connected to the pipes 33 at points near their downturned ends to provide vertical support for the central portion of the articulated pipe assemblies 31, 32. The downturned ends of the pipes 34 are pivotally supported on and connected to each of a pair of identical connector pipe or conduit assemblies 43, 44 by swivel couplings 45.

Since connector pipe assemblies 43, 44 are identical, only assembly 43 will be described in detail and like reference numerals will be employed to designate like parts on the two assemblies. Thus, the connector pipe assembly 43 includes an elongated water conduit or pipe 46 having one end supported for free rolling movement along track 22 by a roller carriage, or trolley 47 and its other downwardly directed open end portion supported by a wheeled carriage assembly 48 for movement into position to be connected to spaced risers or hydrants 49 connected to and projecting upwardly from the water main 19. Outlet valves 50 mounted in the top of each hydrant are operable to supply water from the main to a connector pipe assembly connected to the hydrant.

The inner end of elongated water pipe 46, i.e., the end supported by trolley 47 on track 22, is closed by a cap 51, and a 45° ell 52 is rigidly welded on and communicates with pipe 46 at a point spaced from its end. A short length of flexible hose 53 has one end connected to the open end of ell 52 and its other end connected to a 90° ell 54 connected to and extending downward from the swivel coupling 45 to complete a fluid path from the water pipe 46 through the articulated pipe assembly 31 and manifold 15 to the sprinkler line 10. A rigid metal ring or loop 55 welded on cap 51 cooperates with a link 56 to support the end of the pipe 46 on trolley 47.

The trolleys 47 each include a frame including a pair of laterally spaced side plates 57, 58 joined at their bottom ends by an integrally formed horizontal base member 59 which supports the link 56. A pair of rollers 60a and 60b are mounted between plates 57, 58 adjacent their tops support the trolley 47 for rolling movement on track 22. Rollers 60a and 60b have concave load bearing surfaces defined by a V-shaped groove extending around their periphery to closely conform to and roll on the upwardly directed flat surface of the track 22. A single concave, V-shaped roller 60c is mounted between plates 57, 58 below track 22 and cooperates with the rollers 60a and 60b to maintain trolley 47 against twisting movement on track 22 while permitting free rolling movement therealong. A gimbal support assembly 62 has its outer ring pivotally supported on a bracket 63 mounted on and projecting laterally from side plate 57, and its inner ring connected to the swivel coupling 45 to permit relative movement between the articulated pipe assemblies and the connector pipe assemblies within limits permitted by the hose section 53.

The carriages 48 supporting the outer end portions of the connector pipe assemblies each include a frame 64 including a crosshead 65 having its opposed ends supported on substantially vertical, laterally spaced wheel struts 66, 67. Struts 66, 67 are mounted for pivotal movement about vertical axes defined by bearing sleeves 68, 69 on the opposing ends of frame crosshead 65, and ground engaging wheels 70, 71 are rotatably mounted on the lower ends of wheel struts 66, 67 respectively, to support the outer ends of the carriage assemblies 48 for movement over the ground along water main 19. A drive motor 72 mounted on struts 66 is connected to and drives wheel 70, and a drive shaft 73 having a universal joint in each end portion thereof connects the wheels 70 and 71 so that motor 72 drives both wheels simultaneously.

Figure 3:
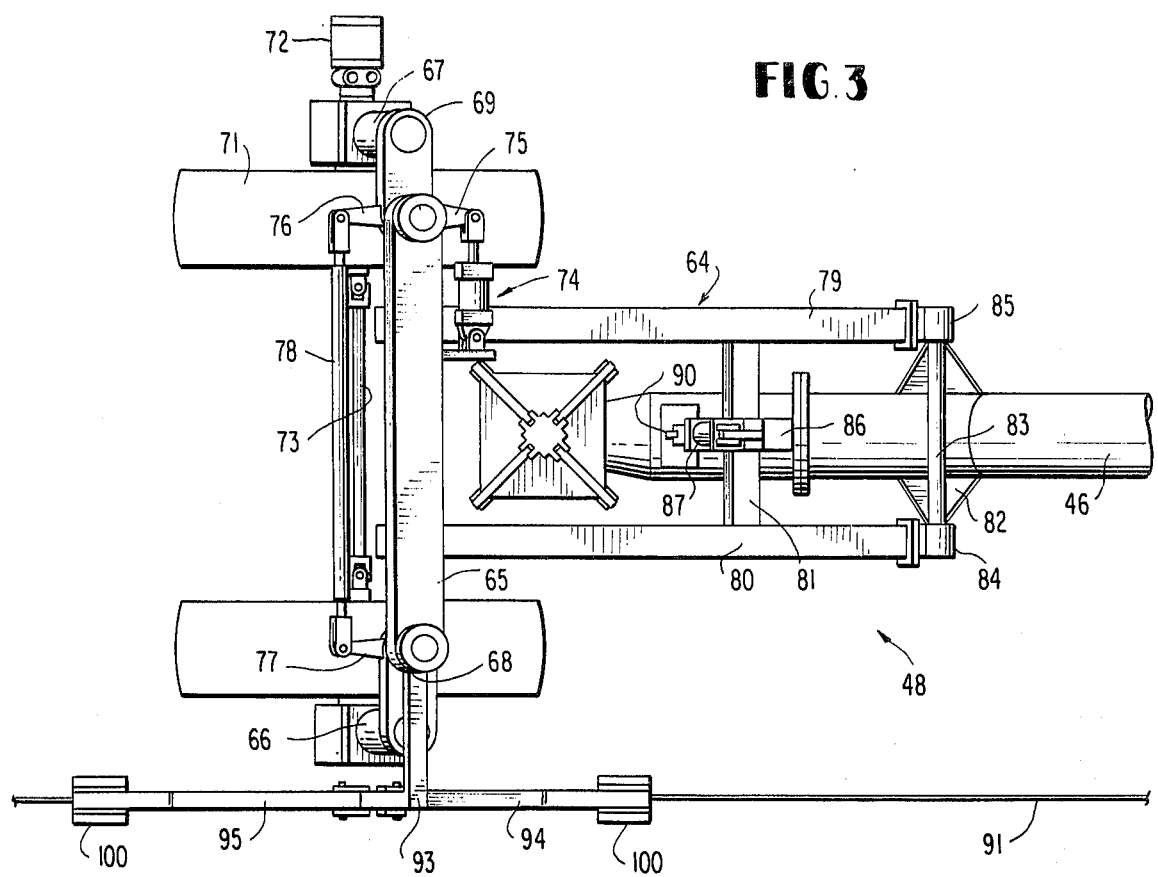
FIG. 3 is an enlarged top plan view of a portion of the apparatus shown in FIG. 1.

As best seen in FIG. 3, a hydraulic cylinder assembly 74 is connected between crosshead 65 and a rearwardly extending steering bracket 75 on wheel strut 67 to steer wheel 71. A pair of forwardly extending arms 76, 77 rigidly welded on wheel struts 66 and 67 are connected by a connecting rod 78 so that both wheels are steered simultaneously by cylinder 74.

Figure 4:
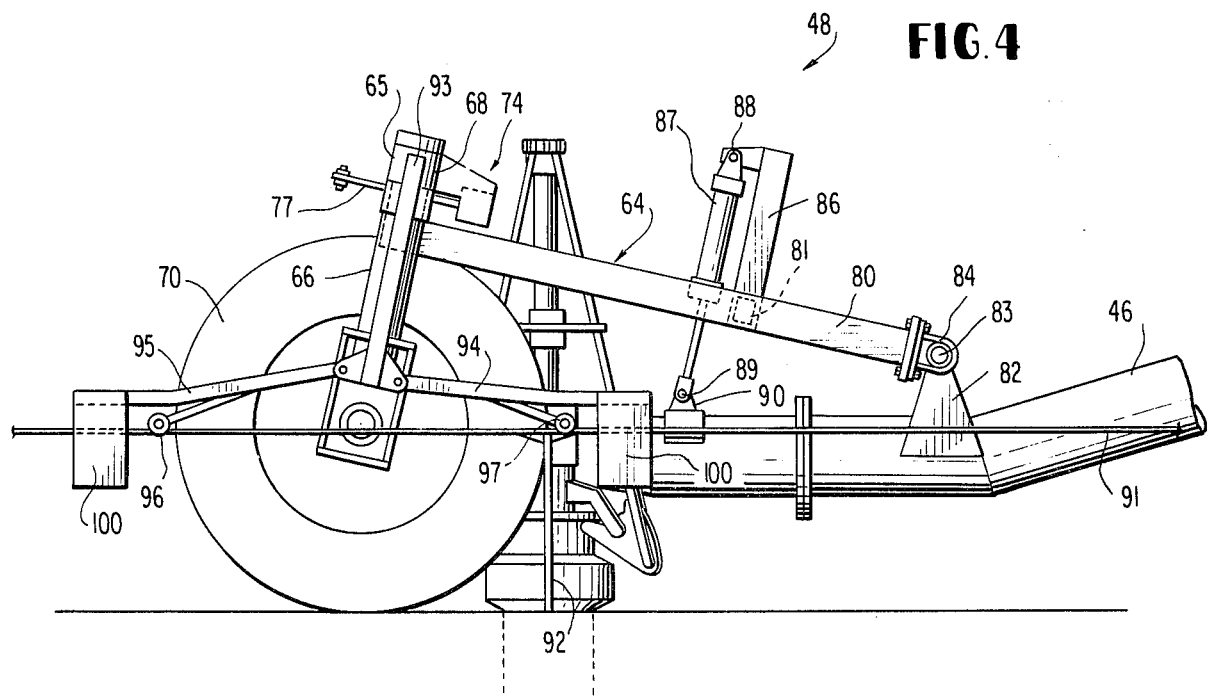
FIG. 4 is a side elevation view of the structure shown in FIG. 3.
Figure 15:
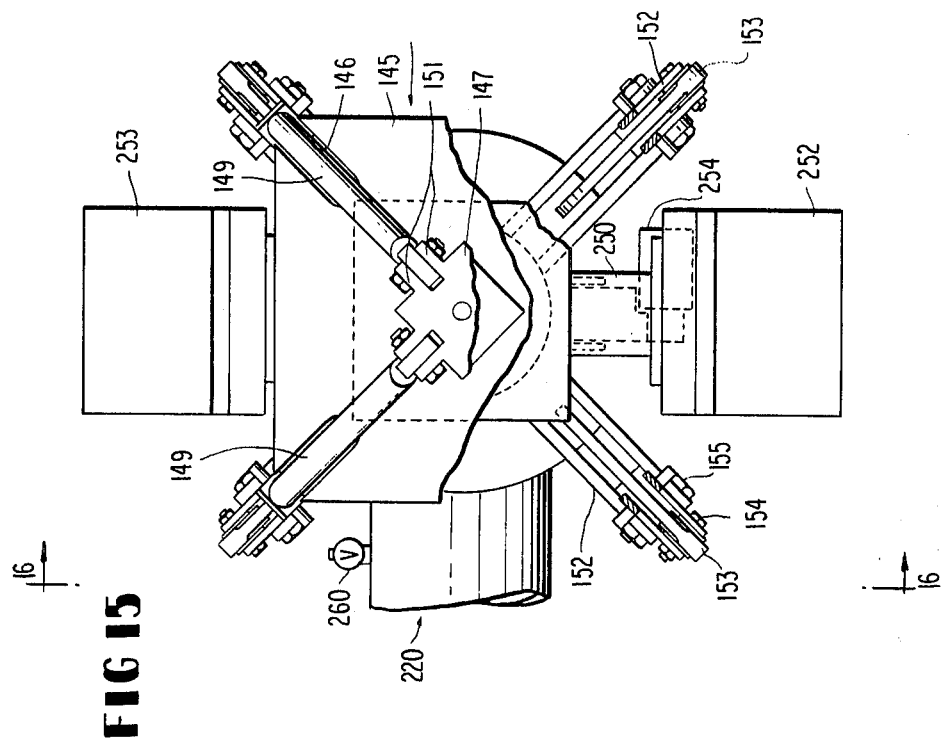
FIG. 15 is a top plan view of a modified form of the coupling means especially useful in connection with the embodiment of the invention shown in FIGS. 13 and 14.
Figure 16:
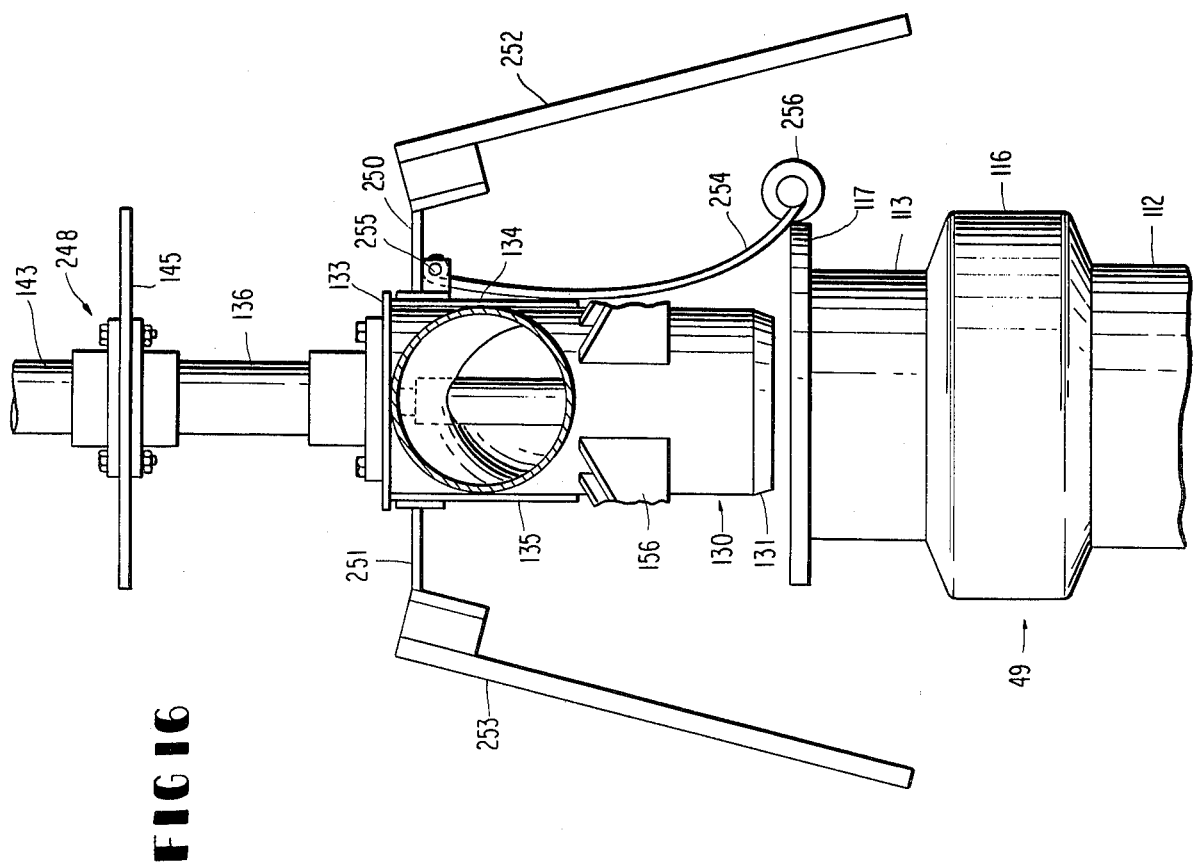
FIG. 16 is a sectional view taken on line 16—16 of FIG. 15.

The frame 64 of carriage assembly 48 includes two rearwardly projecting beams 79, 80 having their forward ends rigidly welded to the crosshead 65 and joined intermediate their ends by a rigid cross beam 81 welded therebetween. Water pipe 46 has an upwardly projecting bracket 82 rigidly welded thereon at a point spaced from its free end, and a transversely extending shaft 83 on bracket 82 has its free ends journaled for rotation in bearings 84, 85 in the free ends of the beams 79, 80, respectively. An upwardly extending support bracket 86 is rigidly welded on cross beam 81, and a fluid cylinder 87 has one end pivotally connected, as by pin 88 on the bracket 86 and its other end connected, through a pin 89 and bracket 90 to the water pipe 46 at a point forward of the support bracket 82. Thus, as best seen in FIG. 4, actuation of the hydraulic cylinder 87 to extend the rod permits rotation of frame 64 about the axis of shaft 83 in a direction to lower the free, open end of water pipe 46 and movement to retract the rod raises the end of the water pipe.

Movement of carriages 48 along the water main 19 is guided by an elongated guide cable or wire 91 stretched above the ground in fixed parallel relation to the water main 19. Cable 91 supported on the tops of metal posts 92 mounted one in fixed laterally spaced relation to each hydrant 49. A support bracket 93 mounted on and projecting outwardly and downwardly from crosshead 65 pivotally supports one end of each of a pair of arms 94, 95 at a point spaced above the guide cable 91, with the arms 94, 95 extending outwardly in opposite directions from the bracket 93 above the cable. A pair of elongated horizontally extending rollers 96, 97 are mounted by support arms 98, 99, respectively, mounted on and projecting downwardly from the bottom surface of the respective arms 94, 95. Rollers 96, 97 are positioned to roll along the top surface of guide cable 91 to support arms 94, 95, respectively, for movement in generally spaced parallel relation above the guide cable.

A pair of identical, flat generally rectangular metal sensing members 100 are mounted on the free ends of each of the arms 94, 95, with the metal sensors of each pair extending downwardly one on each side of and spaced from the guide cable 91. The metal sensors are connected through suitable conductors, not shown, in a control circuit such as a microprocessor, also not shown, for controlling actuation of the steering cylinder 74. By employing two sets of metal sensors, one spaced in front of and one behind the adjacent wheel 71, the signals from each set may be combined, or averaged, thereby minimizing the chance of error and providing more accurate control of steering. Also, by supporting the pivoted arms 94, 95 on rollers rolling along the top of the guide cable, the metal sensors can be maintained at the appropriate height relative to the guide cable to assure maximum sensitivity regardless of irregularities in the terrain over which the carriage 48 is moving. The two sets of metal sensors may also be employed to sense the metal posts 92 supporting the guide cable at each hydrant 49, with the control circuit being operable to stop wheel motor 72 when the signal from the two sets of metal sensors are equal, indicating that the carriage wheel axis is in alignment with a metal post 92 and therefore with a hydrant 49. Alternatively, if desired, a feeler gage, not shown, may be mounted on the wheel support trunnion and project outwardly therefrom in position to engage the post 92 to sense alignment of the carriage with a hydrant and stop the wheel drive motor.

Referring now to FIGS. 9-11, the details of the coupling assembly carried on the end portions of the water pipe 46 for establishing water flow connection with the respective hydrants 49, and the construction of the hydrants 49 including the special outlet valve 50 therein, will be described in detail. Thus, the individual hydrants 49 include a vertically extending pipe section 110 connected in fluid communication with the subterranean water main 19. A valve body 111 is mounted, as by welding, in the open top end of pipe section 110 and water flow control valve assembly 50 mounted in the valve body is normally closed to prevent the escape of water from the hydrant. Valve body 111 includes lower and upper cylindrical sections 112, 113 joined by an enlarged, generally bulbous central section 114. A radially extending valve seat 115, having a central opening 116 therein, is rigidly welded in the valve body at the juncture of central portion 114 at the top cylindrical portion 113. A heavy annular flange 117 is rigidly welded on the open top end of valve body portion 113 and extends outwardly therefrom to define an overhanging ledge 118. The central opening in flange 117 is defined by an upwardly and outwardly diverging, generally cone shaped surface 119, with the opening having a diameter substantially equal to and aligned with the opening 116 in the valve seat 115. A seal assembly including a metal seal retainer ring 120 having a resilient sealing element 121 mounted therein is positioned between the flange 117 and valve seat 115.

A valve member in the form of an annular disk 122 having a resilient seal 123 mounted on its upper surface is supported on an elongated valve stem 124 for movement between the closed or seated position shown in FIGS. 9 and 10 with seal 123 engaging the valve seat 115, and an open position shown in FIG. 11 in which the valve member is disposed centrally within the enlarged central section 114 of the valve body. Valve stem 124 is supported for sliding movement in an axial sleeve bearing 125 supported by a spider 126 mounted within portion 112 of the valve body. A coil spring 127 is mounted on valve stem 124 and extends between bearing 125 and valve plate 122 to normally urge the valve closed. In the closed position water pressure in water main 19 and hydrant 49 presses on the bottom of the valve plate to maintain a tight seal. In the open position, shown in FIG. 11, the enlarged central section 114 of the valve body enables water to flow upward through the hydrant around the valve plate with minimum friction loss. A pressure pad 128 on the top surface of valve disk 122 has generally conical sidewalls to reduce turbulence.

The outer end portions of water pipes 46 each terminate in a 90° ell having its open end directed downward and having short cylindrical, generally vertically extending portion 130 adapted to be received in the open top of hydrants 46 and to form a water tight seal with the resilient seal ring 121. The cylindrical portion 130 of the 90° ell terminates in a slightly inwardly tapered or conical lip 131 which is adapted to cooperate with the conical, upwardly diverging surface 119 on flange 117 to guide the open end of the 90° ell into the open top of a hydrant, despite limited misalignment therebetween, in order to reliably establish a water flow connection between the water pipe and a hydrant.

A coupling mechanism 132 mounted on the end portion of each water pipe 46 is operable to connect and disconnect the downwardly extending cylindrical end of water pipe 46 with hydrants 49. The coupling mechanism 132 is mounted on a horizontal platform 133 supported on gussets 134, 135 rigidly welded onto and projecting upwardly from the sides of pipe 46 adjacent the end thereof. A first fluid actuator has its cylinder 136 mounted, as by bolts 137, on the top of platform 133 and its rod 138 extending down through opening 139 in the platform 133 and received in a cylindrical guide sleeve 140. The guide sleeve 140 is mounted coaxially within the cylindrical end portion 130 with its lower end supported by a spider 141 and its upper end extending through and being welded to the pipe 46. An O-ring seal 142 within the guide sleeve 140 provides a fluid tight seal around the rod 138.

A second hydraulic actuator has its cylinder 143 mounted, as by bolts 144, on the upwardly directed end of the cylinder 136, and a guide plate 145 is firmly clamped between the opposed ends of cylinders 136 and 143. Four equally spaced, radially extending guide grooves 146 are formed in the outer periphery of plate 145. A rigid plate 147 is mounted on the upwardly projecting end of the rod 148 of the second hydraulic actuator, and four identical elongated connecting links 149 each have one end pivotally mounted on the support plate 147 as by mounting bolts 150. Links 149 are mounted on plate 147 at equally spaced intervals therearound by brackets 151 projecting outwardly from the side edges of the plate 147. Links 149 extend downwardly and outwardly, with one disposed in each of the guide slots 146 of plate 145, and terminate in a fork 152 pivotally connected to cam locking members 153 by bolts 154. The cam locking members 153 are in turn pivotally connected, as by bolts 155, to rigid arm members 156 mounted on and projecting outwardly from the downwardly directed end portion 130 of the water pipe 46. The arms 156 are each aligned with one of the guide slots 146 and with one of the bracket members 151 on the top plate 147. Contact between the elongated body portion of the connecting links 149 and guide slots 146 prevent rotation of the rod 148 during extension and retraction thereof.

Referring to FIG. 9 it is seen that, when water pipe 46 is disconnected from the hydrants, the top hydraulic cylinder of the clamping mechanism has its rod 148 extended and cam members 153 are rotated about the axis of their respective mounting bolts 155 to a position to enable the top flange 117 on a hydrant to be received therebetween. When hydraulic cylinder 87 is actuated to lower pipe 46 in response to a signal from the magnetic sensors 100 indicating that the open end of water pipe 46 is in alignment with a hydrant 49, downwardly directed lobes 158 on cams 153 engage the top surface of the flange 117. As pointed out above, slight misalignment between the open end of water pipe 46 and the central opening in flange 117 is accommodated by the tapered surface 119 and by the inclined lip 131. However, in the event of greater misalignment, an inclined cam surface 159 on one or more of the cam members 153 will engage the outer peripheral edge of flange 117 as the outer end portion of water pipe 46 is lowered to cam the end of the water pipe into proper alignment under influence of its own weight. Once the water pipe is in position above the hydrant, with the lobes 158 resting on flange 117, the top hydraulic cylinder is actuated to retract the rod 148 and thereby rotate the cam members 153 to bring a second lobe portion 160 into engagement with the bottom overhanging ledge 118. Continued rotation of cams 153 force the open end of the water pipe into the hydrant and lock it into position as illustrated in FIG. 10. The tapered lip 131 facilitates telescoping movement through the resilient seal 121.

After the open end of water pipe 46 is connected with a hydrant, the first fluid cylinder is actuated to extend its rod 138 from the position shown in FIG. 10 to the position shown in FIG. 11 to engage pressure pad 128 and force valve plate 122 to the open position against the water pressure in the hydrant and against the force of spring 127. In this position, water can flow through the water pipe 46, and the articulated pipe assembly and the manifold connected thereto to the sprinkler lines 10. Water pressure in the system acts to firmly press the resilient seal 121 into sealing contact with the outer cylindrical surface of the downturned end of the water pipe 46 to avoid leakage.

Referring to FIG. 12, a one-way check valve 162 is mounted in water pipe 46 at a point adjacent the downturned 90° ell which defines the end of the water pipe. Valve 162 permits free flow of water through the water pipe from the hydrant toward the articulated pipe assembly but prevents flow in the opposite direction. Thus, with one water pipe connected to a hydrant and the other disconnected, water can flow freely to the sprinkler lines but will be prevented from flowing out through the open end of the other water pipe.

A short section of small diameter pipe 163 is connected in a sidewall of each water pipe 46 between the check valve 162 and its open end. A solenoid actuated valve 164 connected in pipe 163 is normally closed and energized to the open position. The purpose of the solenoid valve is to relieve pressure in the water pipe 46 between one-way check valve 162 and the hydrant 49 connected thereto after the hydrant valve 50 is closed and before the water pipe is disconnected from the hydrant to thereby relieve pressure on the seal 121.

To disconnect a water pipe 46 from a hydrant 49, the bottom fluid cylinder of the connector assembly is actuated to retract its piston 138, thereby permitting the water valve 50 in the hydrant to close. Solenoid valve 164 is then opened to relieve water pressure in the end of the water pipe and permits water pressure in the system to firmly seat the one-way check valve 162 and removes pressure from the resilient seal 121. Thereafter, the second fluid cylinder is actuated to extend the rod 148 to thereby rotate cam members 153 about the axis of bolts 155 to bring the lobes 158 into contact with the top surface of flange 117 to apply a uniform vertical lifting action withdrawing the end of the water pipe from the hydrant. With the end of the water pipe withdrawn from the hydrant and resting on the lobes 158, cylinder 87 is actuated to lift the water pipe and connector assembly clear of the hydrant for movement, upon actuation of wheel motor 72, to the next successive hydrant.

Referring again to FIGS. 1 and 2, it is seen that the overall length of the irrigation apparatus including the track 22 and the two connector pipe assemblies 43, 44, is sufficient to span three hydrants 49 along water main 19 when the connector assemblies are extended to a point adjacent the end of the track 22. In this position, the connector pipe assembly 43 may be connected to a first hydrant, the tractor 12 positioned directly above the next hydrant 49 along the water main 19 and the connector pipe assembly 44 connected to the third successive hydrant 49. When the connector pipe assembly 43 is disconnected from the first hydrant, the tractor can proceed to a position approximately half the distance between the second and third hydrants at which point the trolley 47 supporting the water pipe 46 of connector pipe assembly 44 will have rolled along track 22 to a position adjacent the central platform 16. During this time, connector pipe assembly 43 can be driven forward at a rate greater than the rate of movement of the tractor, with its trolley 47 rolling freely along track 22 independent of movement of the tractor, to position the connector pipe assembly 43 for connection to the second hydrant 49. After connector pipe assembly is connected to the second hydrant, connector pipe assembly 44 can be disconnected from the third hydrant 49 and advanced with tractor 12 along the length dimension of water main 19 into position for connection to the fourth, or next successive hydrant. This procedure can be repeated to progressively walk the apparatus through a field, in either direction, with the tractor being driven at a substantially constant rate corresponding to the rate of movement of the sprinkler line.

Referring now to FIGS. 9-11 and assuming one coupling mechanism 132 has already been connected to a hydrant 49, as the second coupling mechanism 132 approaches a hydrant 49, it passes above and is stopped to vertical alignment with the open top of the hydrant by the metallic sensors 100 and/or the sensor 101. Cylinder 87 normally maintains the water pipe 46 at a height such that its open end clears the top of the hydrants 49 with a substantial margin of safety, then lowers the coupling mechanism 132 to seat the cam lobes 158 on flange 117 when the sensors 100 signal that the coupling mechanism is centered over the hydrant.

Starting with the operating parts of coupling mechanism 132 and outlet valve 50 of the hydrant 49 as shown in FIG. 9, the hydraulic fluid on the top side of the piston in cylinder 87 has its pressure reduced permitting the weight of water pipe 46 to lower the coupling mechanism. Upon such movement, cam surfaces 138 come to rest on flange 117 with the open end of water pipe 46 positioned above the central opening in the flange. Pressure is then applied to the top of the piston in cylinder 143 to rotate cams 153 to insert the open end of the water pipe into the hydrant and to lock it in coupled relation by engagement of cam lobes 160 with the overhanging ledge or rim 118 as shown in FIG. 10.

Considering next the transition from FIG. 10 to FIG. 11, with the coupling member in the position shown in FIG. 10, the hydraulic fluid pressure in cylinder 136 is increased on the upper side of the piston to extend piston rod 140 downwardly to engage the pressure pad 128 and force valve plate 122 downward away from the valve seat 115. In this position, water flows around the valve plate through the enlarged central portion 114 of the valve housing and into the open end of the water pipe. The water pressure engaging the resilient seal 121 provides a positive fluid seal so that no leakage occurs around the outer surface 130 of the water pipe.

As pressure in the end of water pipe 46 increases to and equals pressure in the system, check valve 162 opens, permitting water to flow to the sprinkler lines 10 as described above. Solenoid actuated bleeder valve 164 is, of course, maintained closed when the hydrant valve 50 is open.

Turning now to the first coupling mechanism 137 which was previously assumed connected in water flow relation to a water outlet valve 50 during the time that the second coupling mechanism 132 was being coupled to the outlet valve 50 in a second hydrant as just described, a time delay signal already delays the disconnect sequence of actions in the first coupling mechanism 132 until the second water valve 50 as just described has opened to place its associated water carrying pipe 46 in water flow relation with the main line 19. This time delay assures that at least one water pipe 46 is continuously in water flow connection with the water main 19 and that pressure to the sprinkler lines is uninterrupted. Movement of the tractor 12 need not be interruped while these operations take place, however, since the length of the track 22 and of the connector pipe assemblies 43 and 44 and articulated pipe assemblies 31 and 32 are such as to permit limited movement of the tractor while both connector pipe assemblies are connected to a hydrant. Thus an appreciable time lag in making the connection and valve opening at one hydrant (for example up to a minute) and breaking the connection at the other hydrant will have no objectionable effect, and these connection and disconnection actions need not necessarily be simultaneous but only approximately so.

Before breaking the first coupling member mechanism 132 connection, a suitable control (not shown but per se known) acts in conjunction with closing of the outlet valve 50 in the first coupling member to close the solenoid valve 164 adjacent to that first coupling mechanism. This permits a small quantity of water to be bled off, causing a reduced pressure which results in valve 164 automatically closing. The bleeding action also relieves the water pressure on seal member 121 so that the water pipe can be removed from the hydrant without damage to the seal.

As tractor 12 moves down the field, its respective wheels 17 will at times encounter different ground levels which will cause track 22 to depart from its normal position parallel to the water main 19. However, since the trolleys 47 support the inner ends of pipes 46 through a gimbal support 62, limited vertical and horizontal pivotal movement between the track 22 and the pipes 46 is permitted and limited departure from the normal position of the track does not adversely affect operation of the apparatus.

Since the trolleys 47 are supported by bearing mounted wheels 60a and 60b to roll freely on track 22, very little force is required to maintain a connector assembly stationary as the tractor moves along the water main 19 with the sprinkler line. Thus, once a coupling mechanism 132 is connected to a hydrant 49 this connection will maintain the associated connector pipe assembly stationary until the coupling mechanism is disconnected in sequence. At that time, suitable controls carried by the tractor 12 energize the drive motor 72 in a direction to drive the carriage and the associated connector pipe assembly forward along the water main at a rate which is at least substantially twice the rate of the tractor to move the associated trolley 47 along track 22 to position the associated coupling mechanism 132 adjacent the next successive hydrant 49 while the tractor moves along the water main 19 about one half the distance between successive hydrants. Thus, referring to FIG. 2, with the tractor 12 positioned at one hydrant 49 and moving left to right, the pipe connector assembly 43 connected to the next hydrant forward of the tractor, and the connector assembly 44 having just been disconnected from the next hydrant behind the tractor, the carriage assembly 48 of assembly 44 must be driven at a rate to position its coupling mechanism 132 over the next succeeding hydrant by the time the tractor has reached a point approximately halfway to the next succeeding hydrant. In this position, the trolley 47 of connector assembly 44 will be positioned substantially adjacent the horizontal platform 16 so that the tractor can continue its movement to the next succeeding hydrant without further movement of the connector assembly 44. During this continued movement of the tractor, the connector assembly 43 is disconnected from its hydrant and driven forward to position its associated coupling mechanism 132 above the next succeeding hydrant, at the same time rolling its trolley 47 along the track 22 from the position adjacent the central platform 16 to a position adjacent the end of the track.

In practice, the hydrants 49 may be 50 feet apart along the length of the water main 19, and the total overall length of the track 22 may be approximately 55 feet. With an overall length of the connector pipe assemblies 43, 44 between the associated coupling mechanism and trolleys being approximately 25 feet, the apparatus has a capability of extending to a total length slightly in excess of 100 feet, thereby providing an adequate margin of safety to permit continued movement of the tractor for a limited time while both coupling mechanisms are connected to a hydrant so that precisely simultaneous coupling and uncoupling is not required as described above.

Referring now to FIGS. 13-16, an alternate embodiment of the invention will be described in which the water sprinkler line 10 and truss support 11 has one end portion supported on a tractor assembly 212. The tractor assembly 212 is an open frame structure which includes a pair of laterally spaced A-frame assemblies 213, 214 rigidly joined at their top by truss structure 215 the top chord of which is defined by an elongated, rigid pipe 216 connected to sprinkler line 10. Ground engaging wheels 217, driven by motors 218, support the corners of the tractor assembly, and means are provided to synchronize the respective drive motors to control movement of the tractor along the length dimension of the subterranean water main 19. In this embodiment of the invention, the A-frames 213, 214 are spaced apart a substantially greater distance than are the A-frames 13, 14 of the previously described embodiment. At least one and preferably two pair of spaced metal detectors 219, 219 are supported on A-frame 213, one on each side of the guide cable 91, to guide the tractor 212 along the water main.

Tractor 212 carries a structure having components for cooperating sequentially with the successive water hydrants 49, and the water valves 50 therein, in a manner to maintain a constant water supply to the sprinkler line 10. This structure includes three identical water connecting pipes 220, 220, 220 each having their inner, or water outlet ends connected to a rotatable water manifold 223. In turn, the water manifold 223 is connected to and rotatably supported on the bottom end of a vertically extending pipe 224 rigidly supported on a carriage 225 (FIG. 13). The top, water outlet end of pipe 224 is connected, through swivel coupling 226 and an articulated pipe assembly 227, to the rigid pipe 216. The articulated pipe assembly 227 includes a first horizontal pipe 228 having one end connected to the swivel coupling 226 and its other end connected to a swivel coupling 229, a vertical pipe section 230 having one end connected to the swivel coupling 229 and its other end connected, through a 90° ell 231, to one end of a second horizontal pipe 232 having its other end connected, through swivel coupling 233 to the rigid pipe 216.

The carriage 225 is supported on elongated guide track means 234 suspended, as by support means 235, 236, beneath the truss 215. Roller means 237, 238 on carriage 225 engage the track means 234 to support the carriage for movement longitudinally of the track means which extends generally perpendicular to a vertical plane containing the water main 19. A rack 239 is provided on track means 234, and a reversible servo motor and pinion means 240 mounted on the carriage 225 engage and at least assist in moving the carriage and structure supported thereon along the track.

The three water connecting pipes 220 are each connected to manifold 223 through a flexible coupling 241 to permit limited movement of the outer, free ends of the respective water connecting pipe members independent of movement of the manifold. The cantilevered weight of the respective water connecting pipes is supported by elongated cables 242 each having one end connected adjacent the outer free end of the associated water connecting pipe as at 243, and its other end connected, as at 244, to the central portion thereof with the bight of the respective cable being connected to one end of a hydraulic cylinder 245 having its other end connected, through a bracket 246, to the vertical pipe 224 at a point spaced above the manifold 223.

Each of the water connecting pipes terminate at its outer, free end in an open downwardly directed ell having a hydrant coupling assembly 248 mounted thereon. The structural components of the coupling assemblies 248 for effecting water flow connection with a hydrant 49 is identical to the coupling assemblies 132 described above and accordingly this structure will not be described again and like reference numerals will be used to designate corresponding parts of the two assemblies. However, since control of movement of the free ends of the water connecting pipe assemblies 220 is somewhat less precise than the control of the water pipes 46 of the previously described embodiment, means are provided on the coupling assemblies 248 to assure alignment of the open, downwardly directed cylindrical end 130 with the hydrant 49 before actuation of the coupling means 248. Thus, referring to FIGS. 15 and 16, it is seen that a pair of laterally extending brackets 250, 251, respectively, are mounted on and project outwardly from gussets 134, 135, respectively, at a position adjacent the platform 133. A pair of flat, plate-like metal sensors 252, 253, respectively, are mounted on the brackets 250, 251, respectively, and extend downwardly therefrom in outwardly inclined relation to a point spaced substantially below the bottom lip, or rim 131 of the open end of the respective water connecting pipes. These metal sensors 252, 253 are spaced apart a distance substantially greater than the diameter of the flange 117 so that the flange can be received therebetween despite substantial misalignment between the vertical axes of a hydrant 49 and the cylindrical end portion 130.

An elongated, generally arcuate arm member 254 is pivotally supported, as by pin 255, beneath the bracket 250. A generally cylindrical, elongated bar 256 is supported on the bottom end of curved arm 254 in position to engage the top surface of flange 117 when a connector assembly 248 is lowered in alignment with a hydrant. The cylindrical bar 256 rolls or slides along the flange 117 with further lowering of the connector assembly, causing the curved arm 254 to swing out until the cylindrical bar 256 contacts the adjacent metal sensor 252 to generate a signal indicating that the open end of the water pipe is seated in a hydrant. In response to this signal, cylinders 143 and 136 may be actuated, in the manner and sequence described above with regard to the first embodiment, to complete the coupling between the water connecting pipe 220 and hydrant 49 and to open the hydrant valve 50 to permit water to flow through the system.

In the event of the cylindrical end 130 not being aligned with a hydrant as the cylinder 245 is actuated to lower the water connecting pipe, unequal signals will be generated by the metal sensors 252 and 253 as the result of the hydrant being closer to one of the metal sensors. Upon such unequal signals being generated, control means such as a properly programmed, commercially available microprocessor, not shown, stops the lowering of the water connecting pipe 220 and creates a signal to motor 240 shifting the carriage 225 a small increment in the appropriate direction to equalize the signals. Thereafter, the water connecting pipe is again lowered and, if the signals from the two metal sensors are equal within prescribed limits, lowering continues until coupling is accomplished. However, if the signals from the metal sensors are still so far out of balance as to indicate hookup cannot be accomplished, a second incremental adjustment will automatically be accomplished in the manner just described. As seen in FIG. 13 in addition to the support wires 242, the respective water pipes 220 are connected by wires 257, each including a resilient spring element 258 which permits limited movement of the arms with respect to one another. This enables limited swinging movement as a result of the conical surface 119 and the inclined rim 131 engaging one another to accommodate limited misalignment.

In operation of this embodiment of the invention, one of the water connecting pipes 220 is initially connected to a hydrant 49, through the coupling mechanism 248, to supply water through the manifold 223 and the articulated pipe assembly 227 to the sprinkler line 10. As in the previously described embodiment, one-way check valve means 259 and solenoid actuated bleedoff valve means 260 are provided in the respective water connecting pipes adjacent the open end thereof so that water cannot flow out of the two water connecting pipes not connected to a hydrant. Motors 218 are then operated to drive the tractor 212 at a predetermined rate parallel to the water main 19 while the first water connecting pipe remains connected to a first hydrant 49, thereby causing manifold 213 to be rotated about its vertical axis and causing carriage 225 to be moved along track 234. This movement of carriage 225 may be produced by the reaction force between the water connecting pipe 220 and hydrant 49, although preferably this movement is at least assisted by the motor 240 which can be a servo motor driven at the appropriate rate in response to a sensed condition such as the rotation of manifold 223.

In the embodiment just described, the three water connecting pipes 220 are supported 120° apart so that rotation of the manifold 223 through 120° will position a second coupling assembly 248 above a second hydrant 49. Either the 120° rotation or the position of the carriage 225 on track 234 can be sensed and employed to initiate the coupling action causing the second coupling mechanism to engage and be coupled to the second hydrant in the manner described above. After coupling of the second water connecting pipe and hydrant, the first water connecting pipe coupling mechanism is disconnected from its hydrant and raised to free the manifold 223 and carriage 225 for further movement in the same manner, upon movement of the tractor along the line, to bring the third coupling mechanism into alignment with a third hydrant. Resilient springs 258 and flexible couplings 241 enable movament of the tractor 212 while two coupling members are connected to adjacent hydrants along water main 19 for a brief interval sufficient to assure that continuous water pressure is supplied to the sprinkling line 10.

In order to simplify the description of the invention, certain state-of-the-art devices have not been shown or described. For example, it is contemplated that an internal combustion engine will be provided on the tractor for driving suitable generating and hydraulic pump means to provide power for the various components and that state-of-the-art controls such as microswitches, time delay relays, microprocessors, and the like may be employed to effect control of the various components. Similarly, various modifications and equivalent structures may readily be employed in place of structure specifically described. Thus, while I have disclosed and described preferred embodiments of my invention, I wish it understood that I do not intend to be restricted solely thereto, but rather that I do intend to include all embodiments thereof which would be apparent to one skilled in the art and which come within the spirit and scope of my invention.

I claim:

1. For use in connection with a land irrigation system including an elongated movable connector conduit means having a downwardly directed open end portion adapted to be connected to a water hydrant, a plurality of fixed water hydrants each having an opening in its top for receiving the open end portion of the connector conduit means, and support means operable to move the connector conduit means to position its open end portion above the opening in the top of successive hydrants and for lowering and raising the open end portion of the connector conduit means for connection with and disconnection from a hydrant positioned therebelow, cooperating coupling means on the movable connector conduit means and on the hydrants for releasably coupling the open end portion of the connector conduit means to respective hydrants comprising, a plurality of movable cam members mounted on the connector conduit means and projecting downwardly below and in outwardly spaced relation to the open end portion thereof, said cam members movable from a first position to a second position to releasably couple the connector conduit means to a hydrant and from the second to the first position to uncouple the connector conduit means from the hydrant, means adjacent the top of each hydrant defining an outwardly extending ledge in position to be engaged by the movable cam members, cam surface means on said cam members for engaging said ledge on a hydrant upon movement of said movable cam members from the first position to the second position to align the open end of the connector conduit means with the opening in the top of the hydrant and to forcibly draw the open end of the connector conduit means into the opening in the top of the hydrant and to withdraw the open end of the connector conduit means from the opening in the top of the hydrant upon movement of the cam members from the second to the first position, and actuating means for moving the cam members between the first and second positions.

2. The invention defined in claim 1 further comprising water valve means in each of said hydrants spaced below the opening in the top thereof, and water valve actuator means on said movable connector conduit means and operable to open and close said water valve means in a hydrant when the connector conduit means is connected thereto.

3. The invention defined in claim 2 further comprising seal means in each hydrant between the water valve means and the opening in the top of the hydrant, the seal means being positioned to engage and form a seal with the downwardly directed open end portion when the connector conduit means is connected to a hydrant.

4. The invention as defined in claim 2 further comprising flow control valve means in said connector conduit means operable to permit water to flow through the connector conduit means from a hydrant connected to the downwardly directed open end portion and to prevent flow of water in the opposite direction through the connector conduit means to the open end portion.

5. The invention as defined in claim 4 wherein said flow control valve means is a one-way check valve.

6. The invention as defined in claim 2 wherein said water valve means comprises an axial flow valve including an annular valve seat disposed substantially coaxially with the opening in the top of the hydrant, a valve plate movable between a closed position and seated on said valve seat and an open position spaced therebelow, guide means supporting said valve means for substantially vertical movement between the open and closed positions, and spring means normally biasing said valve plate to the closed position.

7. The invention as defined in claim 6 wherein said valve actuating means comprises a valve actuating rod mounted coaxially within the downwardly directed open end portion of said connector conduct means and having one end engaging said valve plate, and a hydraulic cylinder mounted on said connector conduit means and connected to the other end of said rod, said hydraulic cylinder being operable to extend said valve actuating rod to open the water valve and to retract the valve actuating rod to close the water valve when the connector conduit means is connected to a hydrant.

8. The invention as defined in claim 7 wherein said water valve means comprises a valve body including an enlarged chamber having a diameter substantially greater than the diameter of said valve plate, said enlarged chamber being located below the valve seat whereby, when said valve is opened, said valve plate moves downward into said enlarged chamber to thereby permit free flow of water around the valve plate in the open position.

9. The invention as defined in claim 2 wherein the connector conduit means includes a generally horizontal portion at least adjacent the open end portion, and wherein the open end portion is defined by an ell joined to the generally horizontal portion and having a generally vertical leg extending downwardly and terminating in an open end.

10. For use in connection with a land irrigation system including an elongated movable connector conduit means having a downwardly directed open end portion adapted to be connected to a water hydrant, a plurality of fixed water hydrants each having an opening in its top for receiving the open end portion of the connector conduit means, and support means operable to move the connector conduit means to position its open end portion above the opening in the top of successive hydrants and for lowering and raising the open end portion of the connector conduit means for connection with and disconnection from a hydrant positioned therebelow, cooperating coupling means on the movable connector conduit means and on the hydrants for releasably coupling the open end portion of the connector conduit means to respective hydrants comprising, a plurality of movable cam members mounted on the connector conduit means and projecting downwardly below and in outwardly spaced relation to the open end portion thereof, said cam members being movable from a first position to a second position to releasably couple the connector conduit means to a hydrant and from the second to the first position to uncouple the connector conduit means from the hydrant, means adjacent the top of each hydrant defining an outwardly extending ledge in position to be engaged by the movable cam members, cam surface means on said cam members for engaging said ledge on a hydrant upon movement of said movable cam members from the first position to the second position to forcibly draw the open end of the connector conduit means into the opening in the top of the hydrant and to withdraw the open end of the connector conduit means from the opening in the top of the hydrant upon movement of the cam members from the second to the first position, actuating means for moving the cam members between the first and second positions, water valve means in each of said hydrants spaced below the opening in the top thereof, one-way check valve means in said connector conduit means operable to permit water to flow through the connector conduit means from a hydrant connected to the downwardly directed open end portion and to prevent flow of water in the opposite direction through the connector conduit means to the open end portion, pressure relief means connected to said connector conduit means between said flow control valve means and said open end, said pressure relief means including valve means operable to relieve pressure in said connecting conduit means between the hydrant and the flow control valve means when the water valve means in the hydrant is closed, and water valve actuator means on said movable connector conduit means and operable to open and close said water valve means in a hydrant when the connector conduit means is connected thereto.

11. The invention as defined in claim 10 wherein the connector conduit means includes a generally horizontal portion at least adjacent the open end portion, and wherein the open end portion is defined by an ell joined to the generally horizontal portion and having a generally vertical leg extending downwardly and terminating in an open end.

12. The invention as defined in claim 11 wherein said water valve actuator means comprises a hydraulic cylinder mounted on the connector conduit means above and in generally coaxial relation with the vertical leg of the ell defining the open end portion, a cylindrical guide sleeve mounted coaxially within and extending upwardly from the vertical leg, a rod extending through said sleeve and having one end connected to the hydraulic cylinder for actuation thereby and its other end positioned to engage and actuate said water valve means in a hydrant, and seal means in the sleeve and forming a seal between the rod and sleeve.

13. The invention as defined in claim 12 wherein said flow control valve means is a one-way check valve.

14. The invention defined in claim 3 further comprising seal means in each hydrant between the water valve means and the opening in the top thereof, the seal means being positioned to engage and form a seal with the downwardly directed open end portion when the connector conduit means is connected to a hydrant.

15. The invention as defined in claim 14 wherein said coupling means further comprises metal sensing means mounted on said connector conduit means and projecting downwardly below said open end portion in outwardly spaced relation thereto for sensing the location of a hydrant.

16. The invention as defined in claim 15 wherein said metal detecting means comprises a pair of metal detectors disposed on opposite sides of said open end portion, and means for engaging a hydrant to disable said metal detecting means when the connecting conduit means is connected to a hydrant.

17. For use in connection with a land irrigation system including an elongated movable connector conduit means having a downwardly directed open end portion adapted to be connected to a water hydrant, a plurality of fixed water hydrants each having an opening in its top for receiving the open end portion of the connector conduit means, and support means operable to move the connector conduit means to position its open end portion above the opening in the top of successive hydrants and for lowering and raising the open end portion of the connector conduit means for connection with and disconnection from a hydrant positioned therebelow, cooperating coupling means on the movable connector conduit means and on the hydrants for releasably coupling the open end portion of the connector conduit means to respective hydrants comprising, a plurality of movable cam members mounted on the connector conduit means and projecting downwardly below and in outwardly spaced relation to the open end portion thereof, said cam members being movable from a first position to a second position to releasably couple the connecting conduit means to a hydrant and from the second to the first position to uncouple the connecting conduit means from the hydrant, means adjacent the top of each hydrant defining an outwardly extending ledge in position to be engaged by the movable cam members, cam surface means on said cam members for engaging said ledge on a hydrant upon movement of said movable cam members from the first position to the second position to forcibly draw the open end of the connector conduit means into the opening in the top of the hydrant and to withdraw the open end of the connector conduit means from the opening in the top of the hydrant upon movement of the cam members from the second to the first position, actuating means for moving the cam members between the first and second positions, axial flow water valve means in each of said hydrants spaced below the opening in the top thereof, said water valve means including an annular valve seat disposed substantially coaxially with the opening in the top of the hydrant, a valve plate movable between a closed position seated on said valve seat and an open position spaced therebelow, guide means supporting said valve means for substantially vertical movement between the open and closed positions, spring means normally biasing said valve plate to the closed position, a valve body including an enlarged chamber having a diameter substantially greater than the diameter of said valve plate, said enlarged chamber being located below the valve seat whereby, when said valve is opened, said valve plate moves downward into said enlarged chamber to thereby permit free flow of water around the valve plate in the open position, water valve actuator means on said movable connector conduit means and operable to open and close said water valve means in a hydrant when the connector conduit means is connected thereto, said valve actuating means including a valve actuating rod movably mounted within the downwardly directed open end portion of said connector conduit means and having one end adapted to engage said valve plate, and a hydraulic cylinder mounted on said connector conduit means and connected to the other end of said rod, said hydraulic cylinder being operable to extend said valve actuating rod to open the water valve and to retract the valve actuating rod to close the water valve when the connector conduit means is connected to a hydrant, and a substantially frusto-conical pressure pad mounted on and projecting above said valve plate in position to be engaged by said valve actuating rod to open said water valve means, said frusto-conical shape being effective in reducing turbulence in the valve above said valve plate.

18. The invention as defined in claim 17 wherein said means defining said outwardly extending ledge comprises an annular flange rigidly mounted on the top portion of the hydrant and projecting radially outward therefrom to define a continuous ledge, the flange having a generally horizontal top surface and having a central opening defining the opening in the hydrant top.

19. The invention as defined in claim 18 wherein the central opening in the flange on each hydrant is defined by a generally conical, downwardly and inwardly converging surface adapted to engage and guide the open end portion of a connector conduit means into the opening.

20. The invention as defined in claim 19 wherein said water valve means comprises a valve body including an enlarged chamber having a diameter substantially greater than the diameter of said valve plate, said enlarged chamber being located below the valve seat whereby, when said valve is opened, said valve plate moves downward into said enlarged chamber to thereby permit free flow of water around the valve plate in the open position.

21. The invention as defined in claim 20 further comprising a substantially frusto-conical pressure pad mounted on and projecting above said valve plate in position to be engaged by said valve actuating rod to open said water valve means, said frusto-conical shape being effective in reducing turbulence in the valve above said valve plate.

22. The invention defined in claim 21 further comprising seal means in each hydrant between the water valve means and the opening in the top thereof, the seal means being positioned to engage and form a seal with the downwardly directed open end portion when the connector conduit means is connected to a hydrant.

23. For use in connection with a land irrigation system including an elongated movable connector conduit means having a downwardly directed open end portion adapted to be connected to a water hydrant, plurality of fixed water hydrants each having an opening in its top for receiving the open end portion of the connector conduit means and water valve spaced below the opening in the top, and support means operable to move the connector conduit means to position its open end portion above the opening in the top of successive hydrants and for lowering and raising the open end portion of the connector conduit means for connection with and disconnection from a hydrant positioned therebelow, said connector conduit means including a generally horizontal portion at least adjacent the open end portion, said open end portion being defined by an ell joined to the generally horizontal portion and having a generally vertical leg extending downwardly and terminating in an open end, cooperating coupling means on the movable connector conduit means and on the hydrants for releasably coupling the open end portion of the connector conduit means to respective hydrants comprising, a plurality of movable cam members mounted on the connector conduit means and projecting downwardly below and in outwardly spaced relation to the open end portion thereof, said cam members being movable from a first position to a second position to releasably couple the connecting conduit means to a hydrant and from the second to the first position to uncouple the connecting conduit means from the hydrant, means adjacent the top of each hydrant defining an outwardly extending ledge in position to be engaged by the movable cam members, cam surface means on said cam members for engaging said ledge on a hydrant upon movement of said movable cam members from the first position to the second position to forcibly draw the open end of the connector conduit means into the opening in the top of the hydrant and to withdraw the open end of the connector conduit means from the opening in the top of the hydrant upon movement of the cam members from the second to the first position, actuating means for moving the cam members between the first and second positions, and water valve actuator means on said movable connector conduit means and operable to open and close said water valve means in a hydrant when the connector conduit means is connected thereto, said water valve actuator means including a hydraulic cylinder mounted on the connector conduit means above and in generally coaxial relation with the vertical leg of the ell defining the open end portion, a cylindrical guide sleeve mounted coaxially within and extending upwardly from the vertical leg, a rod extending through said sleeve and having one end connected to the hydraulic cylinder for actuation thereby and its other end positioned to engage and actuate said water valve means in a hydrant, and seal means in the sleeve and forming a seal between the rod and sleeve.

24. The invention as defined in claim 23 further comprising a substantially frusto-conical pressure pad mounted on and projecting above said valve plate in position to be engaged by said valve actuating rod to open said water valve means, said frusto-conical shape being effective in reducing turbulence in the valve above said valve plate.

25. The invention as defined in claim 24 wherein said means defining said outwardly extending ledge comprises an annular flange rigidly mounted on the top portion of the hydrant and projecting radially outward therefrom to define a continuous ledge, the flange having a generally horizontal top surface and having a central opening defining the opening in the hydrant top.

26. The invention as defined in claim 25 wherein the central opening in the flange on each hydrant is defined by a generally conical, downwardly and inwardly converging surface adapted to engage and guide the open end portion of a connector conduit means into the opening.

27. The invention as defined in claim 26 wherein said water valve means comprises a valve body including an enlarged chamber having a diameter substantially greater than the diameter of said valve plate, said enlarged chamber being located below the valve seat whereby, when said valve is opened, said valve plate moves downward into said enlarged chamber to thereby permit free flow of water around the valve plate in the open position.

28. The invention defined in claim 27 further comprising guide means on the connector conduit means for engaging a hydrant to guide said open end portion into alignment with the opening in the top of the hydrant upon operation of the support means to lower the open end portion into position for connection with a hydrant.

29. The invention defined in claim 28 wherein said guide means comprises a guiding surface on the movable cam members.

30. For use in connection with a land irrigation system including an elongated movable connector conduit means having a downwardly directed open end portion adapted to be connected to a water hydrant, a plurality of fixed water hydrants each having an opening in its top for receiving the open end portion of the connector conduit means, and support means operable to move the connector conduit means to position its open end portion above the opening in the top of successive hydrants and for lowering and raising the open end portion of the connector conduit means for connection with and disconnection from a hydrant positioned therebelow, cooperating coupling means on the movable connector conduit means and on the hydrants for releasably coupling the open end portion of the connector means to respective hydrants comprising, a plurality of movable cam members mounted on the connector conduit means in substantially equally spaced relation to one another and projecting downwardly below and in outwardly spaced relation to the open end portion of the connector conduit means, said cam members each being rotatable about a substantially horizontal axis from a first position to a second position to releasably couple the connecting conduit means to a hydrant and from the second to the first position to uncouple the connecting conduit means from the hydrant, means adjacent the top of each hydrant defining an outwardly extending ledge in position to be engaged by the movable cam members, cam surface means on said cam members for engaging said ledge on a hydrant upon movement of said movable cam members from the first position to the second position to forcibly draw the open end of the connector conduit means into the opening in the top of the hydrant and to withdraw the open end of the connector conduit means from the opening in the top of the hydrant upon movement of the cam member from the second to the first position, and cam actuating means for moving said cams between said first and said second positions, said cam actuating means including a hydraulic cylinder mounted on and extending above said downwardly directed upon end portion, and connecting rod means connecting the hydraulic cylinder means with each of said cam members to simultaneously rotate all of said cam members in one direction upon extension of the hydraulic cylinder and in the other direction upon retraction of the hydraulic cylinder.

31. The invention as defined in claim 30 wherein said movable cam members include means for camming said open end portion into substantial vertical alignment with the opening in the top of the hydrant.

32. The invention defined in claim 30 further comprising seal means in each hydrant between the water valve means and the opening in the top thereof, the seal means being positioned to engage and form a seal with the downwardly directed open end portion when the connector conduit means is connected to a hydrant.

33. The invention as defined in claim 32 further comprising flow control valve means in said connector conduit means operable to permit water to flow through the connector conduit means from a hydrant connected to the downwardly directed open end portion and to prevent flow of water in the opposite direction through the connector conduit means to the open end portion.

34. The invention as defined in claim 33 wherein said flow control valve means is a one-way check valve.

35. The invention as defined in claim 33 further comprising pressure relief means connected to said connector conduit means between said flow control valve means and said open end, said pressure relief means including valve means operable to relieve pressure in said connecting conduit means between the hydrant and the flow control valve means when the water valve means in the hydrant is closed.

36. The invention as defined in claim 35 wherein the connector conduit means includes a generally horizontal portion at least adjacent the open end portion, and wherein the open end portion is defined by an ell joined to the generally horizontal portion and having a generally vertical leg extending downwardly and terminating in an open end.

37. The invention as defined in claim 36 wherein said water valve actuator means comprises a hydraulic cylinder mounted on the connector conduit means above and in generally coaxial relation with the vertical leg of the ell defining the open end portion, a cylindrical guide sleeve mounted coaxially within and extending upwardly from the vertical leg, a rod extending through said sleeve and having one end connected to the hydraulic cylinder for actution thereby and its other end positioned to engage and actuate a water valve in a hydrant, and seal means in the sleeve and forming a seal between the rod and sleeve.

38. The invention as defined in claim 36 wherein said water valve means comprises an axial flow valve including an annular valve seat disposed substantially coaxially with the opening in the top of the hydrant, a valve plate movable between a closed position seated on said valve seat and an open position spaced therebelow, guide means supporting said valve means for substantially vertical movement between the open and closed positions, and spring means normally biasing said valve plate to the closed position.

39. The invention as defined in claim 38 wherein said valve actuating means comprises a valve actuating rod mounted coaxially within the downwardly directed open end portion of said connector conduit means and having one end engaging said valve plate, and a hydraulic cylinder mounted on said connector conduit means and connected to the other end of said rod, said hydraulic cylinder being operable to extend said valve actuating rod to open the water valve when the connector conduit means is connected to a hydrant.

40. The invention as defined in claim 39 wherein said water valve means comprises a valve body including an enlarged chamber having a diameter substantially greater than the diameter of said valve plate, said enlarged chamber being located below the valve seat whereby, when said valve is opened, said valve plate moves downward into said enlarged chamber to thereby permit free flow of water around the valve plate in the open position.

41. The invention as defined in claim 40 further comprising a substantially frusto-conical pressure pad mounted on and projecting above said valve plate in position to be engaged by said valve actuating rod to open said water valve means, said frusto-conical shape being effective in reducing turbulence in the valve above said valve plate.

42. The invention as defined in claim 41 wherein said means defining said outwardly extending ledge comprises an annular flange rigidly mounted on the top portion of the hydrant and projecting radially outward therefrom to define a continuous ledge, the flange having a generally horizontal top surface and having a central opening defining the opening in the hydrant top.

43. The invention as defined in claim 42 wherein the central opening in the flange on each hydrant is defined by a generally conical, downwardly and inwardly converging surface adapted to engage and guide the open end portion of a connector conduit means into the opening.

44. For use in connection with a land irrigation system including an elongated water main having a plurality of water outlet valves associated with hydrants projecting from the main at spaced points along its length with each hydrant having an outlet normally closed by one of the outlet valves, and an elongated water sprinkler line extending laterally to and movable along the length dimension of the water main, an apparatus for successively connecting the hydrants to the sprinkler line comprising, conveyance means for moving along the length dimension of the water main at a rate substantially equal to the rate of movement of the sprinkler line, elongated track means extending generally codirectionally with the water main and supported for movement with the conveyance means and sprinkler line at a level above the hydrants, the elongated track means having a total length at least substantially equal to the distance between adjacent hydrants along the water main, a pair of elongated movable connector conduit means each having an inner end portion, support means mounting the inner end portion of each connector conduit means for movement along the track means a distance at least substantially equal to one half the distance between adjacent hydrants along the water main, the respective connector conduit means extending outwardly in generally opposite directions from the conveyance means and generally parallel to the track means and each terminating in an outer end portion having hydrant coupling means associated therewith for establishing water flow connection with the hydrants, power means associated with each said coupling means for connecting the coupling means to the respective hydrants to supply water under pressure to the connector conduit means associated therewith and for disconnecting the coupling means from the hydrants, articulated pipe means connecting the inner end portion of each said connector conduit means with the sprinkler line to provide a water flow path therebetween, said articulated pipe means including a first elongated pipe having one end connected to the sprinkler line through sprinkler line connector means including a first swivel coupling and its other end projecting outwardly for limited pivotal movement about the first swivel coupling, a second elongated pipe having one end connected through a second swivel coupling to the movable end of the first elongated pipe and having its other end connected through a third swivel coupling to the inner end portion of the associated connector conduit means to provide a closed water flow path form a hydrant to the sprinkler line, carriage means including support surface engaging wheel means supporting the outer end portion of each connector conduit means, and drive means for moving each carriage means and the connector conduit means supported thereon longitudinally of the track means and of the water main to successively engage each coupling means with each outlet valve as the apparatus moves along the water main.

45. The invention as defined in claim 44 wherein said coupling means comprises a plurality of movable cam members projecting downwardly below and in outwardly spaced relation to said open end portion, said cam members being movable by said power means from a first position to a second position to releasably coupled the connecting conduit means to a hydrant and from the second and the first position to uncouple the connecting conduit means from a hydrant, means defining an outwardly extending ledge adjacent the top of each hydrant, in position to be engaged by said cam members, and cam surface means on said cam member for engaging said ledge on a hydrant upon movement of said cam members from said first to said second position to forcibly draw the open end portion of the connector conduit means into the opening in the top of a hydrant and to withdraw the open end portion from the hydrant upon movement of the cam members from the second and the first position.

46. The invention as defined in claim 45 further comprising water outlet valve actuator means on each of said pair of movable connector conduit means, said water outlet valve actuator means being operable to open and close the water outlet valve in a hydrant having a connecting conduit means coupled thereto.

47. The invention defined in claim 46 further comprising seal means in each hydrant between the water outlet valve means and the opening in the top thereof, the seal means being positioned to engage and form a seal with the downwardly directed open end portion of a connector conduit means connected to a hydrant.

48. The invention as defined in claim 47 further comprising flow control valve means in each said connector conduit means operable to permit water to flow through the connector conduit means from a hydrant connected thereto and to prevent flow of water in the opposite direction through a connector pipe means not connected to a hydrant.

49. The invention as defined in claim 48 wherein said flow control valve means is a one-way check valve.

50. The invention as defined in claim 48 further comprising pressure relief means connected to said connector conduit means between said flow control valve means and said open end, said pressure relief means including valve means operable to relieve pressure in said connecting conduit means between the hydrant and the flow control valve means when the water valve means in the hydrant is closed.

51. The invention as defined in claim 50 wherein the connector conduit means each include a generally horizontal portion at least adjacent the open end portion, and wherein the open end portion is defined by an ell joined to the generally horizontal portion and having a generally vertical leg extending downwardly and terminating in an open end, and wherein said water valve actuator means comprises a hydraulic cylinder mounted on each connector conduit means above and in generally coaxial relation with the vertical leg of the ell defining the open end portion, a cylindrical guide sleeve mounted coaxially within and extending upwardly from the vertical leg, a rod extending through said sleeve and having one end connected to the hydraulic cylinder for actuation thereby and its other end positioned to engage and actuate said water outlet valve means in a hydrant, and seal means in the sleeve forming a seal between the rod and sleeve.

52. The invention as defined in claim 51 wherein said water outlet valve means comprises an axial flow valve including an annular valve seat disposed substantially coaxially with the opening in the top of the hydrant, a valve plate movable between a closed position seated on said valve seat and an open position spaced therebelow, guide means supporting said valve means for substantially vertical movement between the open and closed positions, and spring means normally biasing said valve plate to the closed position.

53. The invention as defined in claim 52 wherein said valve actuating means comprises a valve actuating rod mounted coaxially within the downwardly directed open end portion of each said connector conduit means and having one end engaging said valve plate, and a hydraulic cylinder mounted on said connector conduit means and connected to the other end of said rod, said hydraulic cylinder being operable to extend said valve actuating rod to open the water valve and to retract the valve actuating rod to close the water valve when the connector conduit means is connected to a hydrant.

54. The invention as defined in claim 53 wherein said water outlet valve means comprises a valve body including an enlarged chamber having a diameter substantially greater than the diameter of said valve plate, said enlarged chamber being located below the valve seat whereby, when said valve is opened, said valve plate moves downward into said enlarged chamber to thereby permit free flow of water around the valve plate in the open position.

55. The invention as defined in claim 54 wherein said means defining said outwardly extending ledge comprises an annular flange rigidly mounted on the top portion of the hydrant and projecting radially outward therefrom to define a continuous ledge, the flange having a generally horizontal top surface and having a central opening defining the opening in the hydrant top, and
wherein the central opening in the flange on each hydrant is defined by a generally conical, downwardly and inwardly converging surface adapted to engage and guide the open end portion of a connector conduit means into the opening.

56. For use in connection with a land irrigation system including an elongated water main having a plurality of outlet valves associated with hydrants projecting from the main at spaced points along its length and an elongated water sprinkler line extending laterally to and movable along the length dimension of the water main, an apparatus for successively connecting the outlet valves to the sprinkler line comprising,
conveyance means for moving along the length dimension of the water main at a rate substantially equal to the rate of movement of the sprinkler line,
elongated track means mounted for movement with the conveyance means and sprinkler line at a level above the hydrants, the track means extending forward and rearward from the conveyance means in the general direction of movement along the water main,
a pair of elongated connector conduit means each having an inner end portion,
support means mounted on said track means for longitudinal movement therealong from an extended position spaced outwardly from said conveyance means to a retracted position adjacent said conveyance means, said support means mounting the inner end portions of the connection conduit means for movement therewith along the track means, the respective connector conduit means extending outwardly from the conveyance means in generally opposite directions and generally parallel to the track means and to the direction of movement of the conveyance means and each terminating in an outer end portion having coupling means thereon,
each said coupling means including means for connecting with an outlet valve to supply water under pressure to the connector conduit means associated therewith and for disconnecting the coupling means from the outlet valve,
articulated conduit means connecting the inner end portion of each said connector conduit means with the sprinkler line to provide a water flow path therebetween, said articulated conduit means being longitudinally extensible in the direction of movement fo the connector conduit means,
carriage means including ground supported wheel means supporting the outer end portion of each connector conduit means, and
drive means for moving each carriage means and the outer end portion of the connector conduit means supported thereby independently of movement of the conveyance means and of the other carriage means longitudinally of the track means and of the water main to successively engage each coupling means with each outlet valve.

57. The invention as defined in claim 56 wherein said drive means comprises motor means carried by each carriage means, the motor means on each carriage means being operable to drive the carriage means and the connector conduit means associated therewith at a rate at least double the rate of movement of the conveyance means and sprinkler line.

58. The invention as defined in claim 56 further comprising means supporting the outer end portion of the associated connector conduit means for limited vertical movement relative to the carriage means, and power means connected between the carriage means and the outer end portion of the connector conduit means for effecting such limited vertical movement.

59. The invention as defined in claim 56 wherein said support means mounts the inner end portions of both said connector conduit means for movement along said track means along a common straight line.

60. For use in connection with a land irrigation system including an elongated water main having a plurality of outlet valves located in hydrants at spaced points along the length of the main and an elongated water sprinkler line extended laterally to and movable along the length dimension of the water main, an apparatus for successively connecting the outlet valves to the sprinkler line comprising,
conveyance means for movement along the length dimension of the water main at a rate substantially equal to the rate of movement of the sprinkler line,
elongated track means mounted for movement with the conveyance means, the track means extending in the direction of movement of the conveyance means and having a length at least substantially equal to the distance between adjacent hydrants along the water main, cam members from the second to the first position, and actuating means for moving the cam members between the first and second positions.

68. The invention as defined in claim 67 further comprising flow control valve means in said connector conduit means operable to permit water to flow through the connector conduit means from a hydrant connected to the downwardly directed open end portion and to prevent flow of water in the opposite direction through the connector conduit means to the open end portion.

69. The invention as defined in claim 68 further comprising pressure relief means connected to said connector conduit means between said flow control valve means and said open end, said pressure relief means including valve means operable to relieve pressure in said connecting conduit means between the hydrant and the flow control valve means when the water valve means in the hydrant is closed.

70. The invention as defined in claim 69 further comprising seal means carried by one of said open end portions and engaging the other to form a seal therebetween when the two open end portions are telescoped together.

* * * * *

UNITED STATES PATENT AND TRADEMARK OFFICE
CERTIFICATE OF CORRECTION

PATENT NO. : 4,412,655
DATED : November 1, 1983
INVENTOR(S) : ALLEN T NOBLE

It is certified that error appears in the above—identified patent and that said Letters Patent are hereby corrected as shown below:

Col. 24, line 26, after "claim", "36" should be --37--;

Signed and Sealed this

Twenty-fourth Day of April 1984

[SEAL]

Attest:

GERALD J. MOSSINGHOFF

Attesting Officer     Commissioner of Patents and Trademarks